United States Patent
Leicher et al.

(10) Patent No.: US 10,044,713 B2
(45) Date of Patent: Aug. 7, 2018

(54) OPENID/LOCAL OPENID SECURITY

(75) Inventors: Andreas Leicher, Frankfurt (DE); Andreas Schmidt, Frankfurt am Main (DE); Yogendra Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/589,991

(22) Filed: Aug. 20, 2012

(65) Prior Publication Data
US 2013/0227658 A1    Aug. 29, 2013

Related U.S. Application Data

(60) Provisional application No. 61/525,575, filed on Aug. 19, 2011.

(51) Int. Cl.
*H04L 29/06* (2006.01)

(52) U.S. Cl.
CPC ................ *H04L 63/0876* (2013.01)

(58) Field of Classification Search
CPC ............. H04L 63/0807; H04L 63/0876; H04L 63/0428; H04L 2463/121; G06F 21/335; G06F 21/10; G06F 17/30091; G06F 2221/2115; H04W 12/06
USPC ........................................................... 726/5
See application file for complete search history.

(56) References Cited

U.S. PATENT DOCUMENTS

| | | | |
|---|---|---|---|
| 6,988,250 B1 * | 1/2006 | Proudler et al. | 713/160 |
| 7,441,118 B2 * | 10/2008 | Lawman et al. | 713/164 |
| 7,587,491 B2 * | 9/2009 | Hinton | H04L 63/104 |
| | | | 707/999.001 |
| 7,628,322 B2 | 12/2009 | Hoitmanns et al. | |
| 7,698,398 B1 * | 4/2010 | Lai | G06F 8/10 |
| | | | 709/223 |
| 7,809,948 B2 * | 10/2010 | Lewis | H04L 9/3271 |
| | | | 713/168 |
| 7,840,804 B2 * | 11/2010 | Oikawa | G06F 21/31 |
| | | | 380/277 |

(Continued)

FOREIGN PATENT DOCUMENTS

| | | |
|---|---|---|
| CN | 101022651 | 8/2007 |
| CN | 101156412 A | 4/2008 |

(Continued)

OTHER PUBLICATIONS

How Certificate Services Works, Microsoft, Updated: Sep. 22, 2010, https://technet.microsoft.com/en-us/library/cc783853.*

(Continued)

*Primary Examiner* — Oleg Korsak
*Assistant Examiner* — Shu C Gao
(74) *Attorney, Agent, or Firm* — Baker & Hostetler, LLP

(57) ABSTRACT

Identity management, user authentication, and/or user access to services on a network may be provided in a secure and/or trustworthy manner, as described herein. For example, trustworthy claims may be used to indicate security and/or trustworthiness of a user or user device on a network. Security and/or trustworthiness of a user or a user device on a network may also be established using OpenID and/or local OpenID, a secure channel between a service and the user device, and/or by including a network layer authentication challenge in an application layer authentication challenge on the user device for example.

14 Claims, 37 Drawing Sheets

(56) References Cited

U.S. PATENT DOCUMENTS

| | | | |
|---|---|---|---|
| 7,877,787 B2 | 1/2011 | Laitinen et al. | |
| 7,978,855 B2 | 7/2011 | Cho | |
| 8,291,222 B2 | 10/2012 | Blommaert | |
| 8,295,487 B2* | 10/2012 | Haddad | H04L 63/0823 380/270 |
| 8,397,063 B2 | 3/2013 | Dicrescenzo | |
| 8,819,413 B1* | 8/2014 | Hernacki | G06F 21/33 713/151 |
| 9,015,130 B1* | 4/2015 | Michaelis | G06Q 10/00 707/689 |
| 9,015,473 B2 | 4/2015 | Costa | |
| 9,047,455 B2* | 6/2015 | Dietrich | G06F 21/31 |
| 9,264,237 B2* | 2/2016 | Nguyen | H04L 9/0866 |
| 9,300,641 B2 | 3/2016 | Laitinen | |
| 2003/0016122 A1* | 1/2003 | Petrick | 340/10.41 |
| 2003/0226017 A1 | 12/2003 | Palekar et al. | |
| 2004/0127256 A1* | 7/2004 | Goldthwaite et al. | 455/558 |
| 2004/0162786 A1* | 8/2004 | Cross et al. | 705/59 |
| 2004/0162789 A1 | 8/2004 | Huscher et al. | |
| 2005/0044365 A1 | 2/2005 | Haukka et al. | |
| 2006/0020791 A1 | 1/2006 | Laitinen | |
| 2006/0021018 A1* | 1/2006 | Hinton | H04L 63/06 726/10 |
| 2006/0053296 A1 | 3/2006 | Busboom et al. | |
| 2006/0161771 A1 | 7/2006 | Zhang | |
| 2006/0182280 A1 | 8/2006 | Laitinen et al. | |
| 2006/0185003 A1 | 8/2006 | Laitinen et al. | |
| 2006/0196931 A1 | 9/2006 | Holtmanns et al. | |
| 2006/0236116 A1 | 10/2006 | Patel | |
| 2006/0236382 A1* | 10/2006 | Hinton | H04L 63/0815 726/8 |
| 2007/0101122 A1 | 5/2007 | Guo | |
| 2007/0101145 A1* | 5/2007 | Sachdeva | H04L 63/0815 713/176 |
| 2008/0046987 A1* | 2/2008 | Spector | G06F 21/604 726/6 |
| 2008/0132931 A1 | 6/2008 | Mueller | |
| 2008/0155675 A1* | 6/2008 | Tu et al. | 726/9 |
| 2008/0192931 A1 | 8/2008 | Cho et al. | |
| 2008/0320576 A1* | 12/2008 | Curling | H04L 63/0815 726/8 |
| 2009/0132806 A1 | 5/2009 | Blommaert et al. | |
| 2009/0158032 A1 | 6/2009 | Costa et al. | |
| 2009/0216644 A1 | 8/2009 | Summer et al. | |
| 2009/0235069 A1* | 9/2009 | Sonnega | H04L 63/062 713/156 |
| 2009/0300197 A1 | 12/2009 | Tanizawa et al. | |
| 2009/0300747 A1* | 12/2009 | Ahn | 726/9 |
| 2010/0136943 A1 | 6/2010 | Hirvela et al. | |
| 2011/0055565 A1 | 3/2011 | Murakami et al. | |
| 2011/0083011 A1* | 4/2011 | DiCrescenzo | H04L 9/006 713/158 |
| 2011/0145575 A1 | 6/2011 | Blommaert et al. | |
| 2011/0307694 A1 | 12/2011 | Broustis et al. | |
| 2012/0023565 A1* | 1/2012 | Tumanyan | 726/8 |
| 2012/0023568 A1* | 1/2012 | Cha | G06F 21/335 726/10 |
| 2012/0036360 A1 | 2/2012 | Bassu et al. | |
| 2012/0102315 A1 | 4/2012 | Holtmanns et al. | |
| 2012/0204231 A1 | 8/2012 | Holtmanns et al. | |
| 2013/0024919 A1 | 1/2013 | Wetter et al. | |
| 2013/0097698 A1 | 4/2013 | Taveau et al. | |
| 2013/0104202 A1 | 4/2013 | Yin et al. | |
| 2013/0125222 A1* | 5/2013 | Pravetz et al. | 726/6 |
| 2013/0238461 A1 | 9/2013 | Tieken et al. | |

FOREIGN PATENT DOCUMENTS

| | | |
|---|---|---|
| CN | 101160778 A | 4/2008 |
| CN | 101164086 A | 4/2008 |
| CN | 101707594 | 5/2010 |
| DE | 102005026982 A1 | 12/2006 |
| JP | 2005-160005 | 6/2005 |
| JP | 2005-535006 | 11/2005 |
| JP | 2005-536154 | 11/2005 |
| JP | 2006-050535 | 2/2006 |
| JP | 2008-530879 A | 8/2008 |
| JP | 2008-532114 A | 8/2008 |
| JP | 2008/546333 | 12/2008 |
| JP | 2009-290329 A | 10/2009 |
| KR | 10-2010-0075603 | 7/2010 |
| WO | WO 03/077572 | 9/2003 |
| WO | WO 03/100544 | 12/2003 |
| WO | WO 2004-017617 | 2/2004 |
| WO | WO 2006-085207 A1 | 8/2006 |
| WO | WO 2006/131414 | 12/2006 |
| WO | WO 2009-106091 A1 | 9/2009 |

OTHER PUBLICATIONS

How CA Certificates Work, Microsoft, Updated: Mar. 28, 2003, https://technet.microsoft.com/en-us/library/cc737264(v=ws.10). aspx[Dec. 11, 2016 1:08:16 PM].*

U.S. Appl. No. 13/428,836, filed Mar. 23, 2012, Cha.

3GPP Standard; 3GPP TR 33.924, "3rd Generation Partnership Project; Technical Specification Group Services and System Aspects; Identity management and 3GPP security interworking; Identity management and Generic Authentication Architecture (GAA) interworking (Release 9)", No. V9.3.0, Oct. 6, 2010, pp. 1-39.

3GPP TR 33.914, "3rd Generation Partnership Project; Technical Specification Group Services and System Aspects; Single Sign on Application Security for Common IMS—based on SIP Digest (Release 11)," No. V2.0.0, Feb. 2012, pp. 1-48.

3GPP TR 33.924, "3rd Generation Partnership Project; Technical Specification Group Services and System Aspects; Identity management and 3GPP security interworking; Identity management and Generic Authentication Architecture (GAA) interworking (Release 9)," No. V9.4.0, Jun. 2011, pp. 1-40.

3GPP TS 33.220, "3rd Generation Partnership Project; Technical Specification Group Services and System Aspects; Generic Authentication Architecture (GAA); Generic bootstrapping architecture (GBA) (Release 9)," No. V9.4.0, Mar. 2012, pp. 1-75.

Blumenthal, U. and Goel, P., "Pre-Shared Key (PSK) Ciphersuites with NULL Encryption for Transport Layer Security (TLS)," RFC 4785, Network Working Group, © The IETF Trust, Jan. 2007, pp. 1-5.

Eronen, P., and Tschofenig, H., "Pre-Shared Key Ciphersuites for Transport Layer Security (TLS)," RFC 4279, Network Working Group, © The Internet Society, Dec. 2005, pp. 1-15.

Ferg et al., "OpenID Authentication 2.0—Final," http://openid.net/specs/openid-authentication-2_0.html, Dec. 5, 2007, pp. 1-36.

Franks et al., "An Extension to HTTP : Digest Access Authentication," RFC 2069, Network Working Group, Jan. 1997, pp. 1-17.

Franks et al., "HTTP Authentication: Basic and Digest Access Authentication," RFC 2617, Network Working Group, © The Internet Society, Jun. 1999, pp. 1-32.

International Patent Application No. PCT/US2012/030352: International Search Report and Written Opinion dated Aug. 8, 2012, 14 pages.

Rescorla, E., "Keying Material Exporters for Transport Layer Security (TLS)," RFC 5705, Internet Engineering Task Force, © The IETF Trust, Mar. 2010, pp. 1-7.

Williams, Sun N., "On the Use of Channel Bindings to Secure Channels; rfc5056.txt", Nov. 1, 2007, 23 pages.

Watanabe,R. and Tanaka,T., "Federated Authentication Scheme Using Mobile Cellular", Proceedings of Computer Security Symposium 2008, 2008(8), 61-66, Information Processing Society of Japan, Japan, Oct. 8, 2008.

Kaji et al, "A Model for Establishing Secure Communication in Secure Service Platform,"IPSJ SIG Technical Report, Mar. 23, 2005, 2005(33), pp. 151-156, Information Processing Society of Japan, Japan, Abstract on p. 151.

Schmidt et al, "Sender Scorecards," IEEE Vehicular Technology Magazine, Mar. 4, 2011, 6(1), 52-59.

Chinese application No. 201280017807: First Office Action dated Dec. 18, 2015, 9 pages.

(56) References Cited

OTHER PUBLICATIONS

Japanese Application No. 2014-501278: Notice of Allowance dated Oct. 27, 2015, 6 pages.
3rd Generation Partnership Project; (3GPP) TS 33.220 PKT-SP-33.220-I03-070925 CableLabs, "Generic Authentication Architecture (GAA); Generic Bootstrapping Architecture Specification", 11 pages, Sep. 25, 2007, http://www.cablelabs.com/wp-content/uploads/specdocs/PKT-S P-33.220-I03-070925.PDF.
3$^{rd}$ Generation Partnership Project; (3GPP) TR 33.914 V0.3.0, Technical Specification Group Services and System Aspects; Single Sign on Application Security for Common IMS-Based on SIP Digest (Release 11), Jan. 2011, 7 pages.
3rd Generation Partnership Project; (3GPP) TS 33.220 V10.0.0, 3rd Generation Partnership Project; Technical Specification Group Services and sustem Aspects; Generic Authentication Architecture (GAA); Generic Bootstrapping Architecture (GBA) (Release 10), Oct. 2010, 10 pages.
3GPP TSG SA WG3 Security-S3#62 S3-110030, "General Issues with SIP Digest", Nokia Corporation, Nokia Siemens Networks, Ljubljana, Slovenia, Jan. 24-28, 2011, 4 pages.
3GPP TSG-SA WG3 Meeting #63 S3-110447, "The Use of Protocol Binding for SIP Digest Over TLS to Prevent MitM Attacks in TR 33.914", Chengdu, china Apr. 11-15, 2011, 4 pages, http://www.3GPP.org/ftp/tsg_sa/WG3_Security/TSGS3_63_Chengdu/Docs/S3-110447.zip.
Japanese Application No. 2015-096945: Notice of Rejection dated Jun. 21, 2016, 6 pages.
Chinese Application No. 201280017807.5: Second Notification of Office Action dated Oct. 20, 2016, 13 pages.
Japanese Application No. 2015-257148: Notice of Rejection dated Oct. 11, 2016, 5 pages.

\* cited by examiner

1102

My Contact Card    Update Card »

Sam Smart
OpenID Expert, Smart OpenID...
No Location Added

Work Email    SmartOpenID@mailinator.com
Work Phone    Add Now
Work IM       Add Now Home Email    SmartOpenID@mailinator.com
Home Phone    Add Now
Home IM       Add Now

Is Your Address Book Reliable?

With Plaxo Personal Assistant, you will always have the most current contact info

US 10,044,713 B2

OPENID/LOCAL OPENID SECURITY

CROSS REFERENCE TO RELATED APPLICATIONS

This application claims the benefit of U.S. Provisional Patent Application Ser. No. 61/525,575, filed Aug. 19, 2011 the contents of which is hereby incorporated by reference in its entirety.

BACKGROUND

A user/user equipment (UE) may be able to access services (e.g. web services) provided by a service provider via a network. In order to provide such services, the service provider may rely on a trusted third party (e.g., a network operator) to inform the service provider that the user/UE is trustworthy or secure. However, even when using a trusted third party, the integrity and/or trustworthiness of the user/UE may be uncertain.

SUMMARY

Described herein are systems, methods, and apparatus for providing identity management, user authentication, and/or user access to services on a network in a secure and/or trustworthy manner. According to one embodiment, trustworthy claims may be used to indicate security and/or trustworthiness of a user or user device on a network. For example, a user device may receive a claim from the network. The claim may be representative of a verifiable attribute of an identity associated with the user device. The claim may be stored on a secure local entity on the user device. A digital identity may be created, based on the claim, corresponding to a service that may be provided.

According to an embodiment, security and/or trustworthiness of a network entity or a user may be provided using OpenID (including OpenID and/or local OpenID for example).

According to an embodiment, a secure channel between a service and a user equipment (UE) may be established.

According to an embodiment, a network layer authentication challenge may be included in an application layer authentication challenge to authenticate the application layer on a UE.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
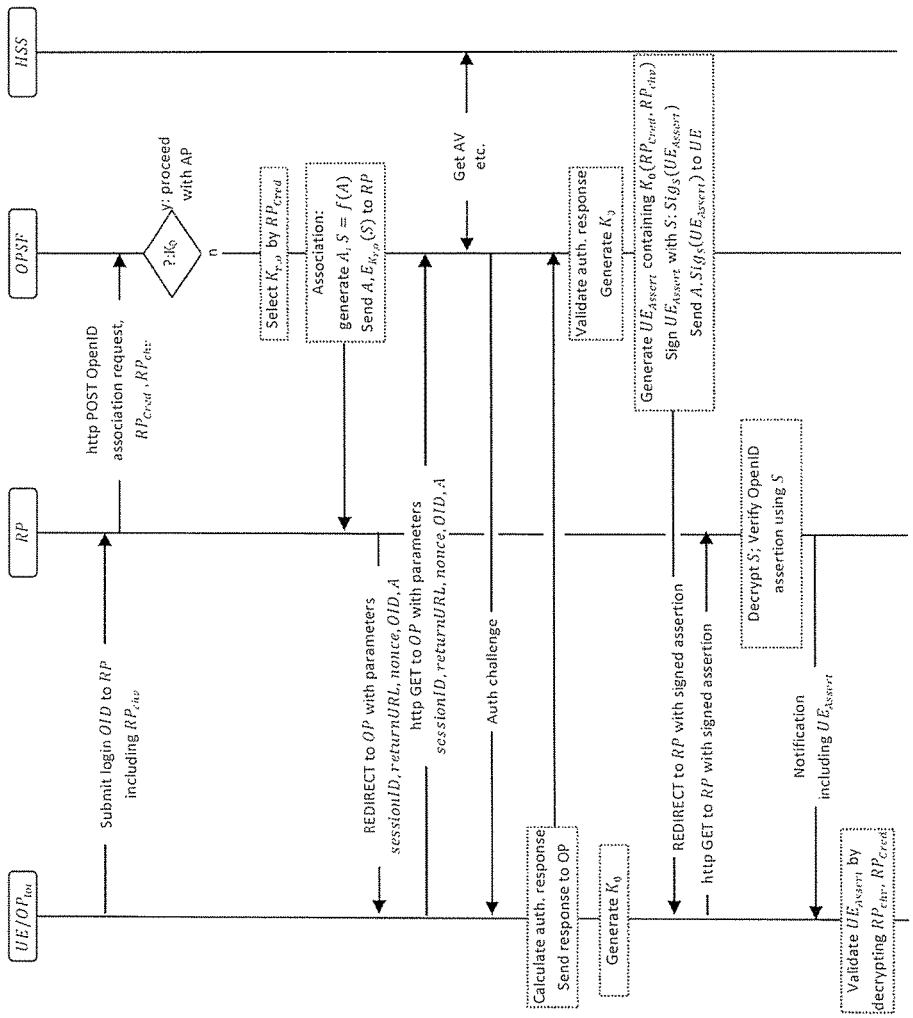
FIG. 1 is a flow diagram of an example provisioning phase of the protocol, in which a shared secret $K_0$ between OP and UE is established according to an embodiment.

Systems, methods, and apparatus are disclosed herein for using a local ID provider on a user device. In local OpenID, some functionality of the OpenID Provider (OP) in the ordinary OpenID may be performed by a local entity (such as the UE, gateway, smart card, UICC, etc). Authentication of relying parties (RPs) in OpenID authentication flows is provided. This may be useful, for example, in cases where the users/user equipment (UE) and the RP may not have a pre-established trust relationship such as a web site certificate. Another method embodiment includes the establishment of a local OP-RP private shared secret.

A description of various terms used herein is provided. OP Service Function (OPSF) is a term used to indicate systems, methods, and apparatus that implement the supporting OP functionality which is able to generate, share, and/or distribute secrets for the OpenID protocol with the Gateway-based OP, and optionally the relying party (RP). The OPSF and the Gateway-based OP may be acting from the perspective of the RP as if they were a single entity. The OPSF may be able to verify signatures issued by the Gateway-based OP and may be directly reachable for the RP via the internet. The browser on a device may be redirected to the Gateway-based OP by modifying the local DNS resolving cache on the device such that the address of the OPSF may map to the local Gateway-based OP. OPSF may be co-located with OP-Agg.

$OP_{loc}$ is a term used to describe a local OP assertion provider of the local OpenID protocol, such as the local OpenID protocol. $RP_{CHS}$ is a term used to describe a nonce posed for authentication from an to an $OP_{loc}$ to prevent replay for example. $RP_{cred}$ is a term used to describe an identifier for the RP by which OPSF is able to select the correct key. $K_{r,o}$ is a term used to describe a long-term key shared for between an RP and an OPSF. $K_0$ is key generated in the provisioning phase and used there for encryption of parts of the $UE_{Assert}$ message. $K_0$ may also be used in subsequent authentication phases to derive the Open ID signing key. $K_0$ may be shared between $OP_{loc}$ and OPSF and used in subsequent Authentication Phases to derive the Open ID signing key. HSS is a term used to describe a network entity delivering Authentication Vectors (AV) for authentication of the UE/$OP_{loc}$. $UE_{Assert}$ is a term used to describe an enhanced Open ID assertion. $UE_{Assert}$ may be encrypted with Open ID signing key S. S is a term used to describe an OpenID assertion signing key used in a provisioning phase. $K_1$ is a term used to describe an Open ID assertion signing key used in authentication phase. XS is a term used to describe some unique key material extracted from the secure channel which both endpoints are able to extract and have in common afterward.

Transparent Delegated Authentication of RP to Local OP

In accordance with embodiments disclosed herein, protocols are disclosed that show how to add an RP authentication feature to OpenID and make use of the local assertion provider. To facilitate an understanding in overview, only some parameters are shown and described. In particular, at various places, nonces may be added for replay protection (e.g., step 2 of the protocol in FIG. 1).

An aspect of the disclosed method to authenticate the relying party (RP) is that of delegated authentication by the OpenID Service Function (OPSF) node. It follows a general challenge-response strategy in which $OP_{loc}$ poses a challenge $RP_{CHS}$. This challenge may be encrypted (e.g., included in a twice encrypted assertion message $UE_{Assert}$ by OPSF) in an appropriate way such that an authentic RP is able to decrypt it. According to one example, the RP may decrypt the outer encryption layer, and the $OP_{loc}$ may be able to decrypt the inner layer. It is assumed, at least for this example, that RP and OPSF share a secret $K_{r,o}$.

FIG. 1 illustrates a message flow diagram of an example provisioning phase (PP) of the protocol, in which a shared secret $K_0$ between OpenID provider (OP) and user equipment (UE) is established. In the provisioning phase, OPSF and $OP_{loc}$ do not yet share a secret, but such a secret may be established inside the protocol run by including a network-based authentication, using a network entity HSS. This may follow a Local OpenID/GBA combination, as described herein. $RP_{Cred}$ is an identifier of RP which allows OPSF to select the correct pre-shared key $K_{r,o}$. $RP_{Cred}$ may be omitted from messaging if OPSF identifies RP by other means, e.g., Internet URL. By including and $RP_{CHS}$ and $RP_{Cred}$ in $UE_{Assert}$, encrypted with $K_0$, the $OP_{loc}$ is assured that the last message that is received originated from the RP identified by $RP_{Cred}$. By way of comparing the identity claimed in $RP_{Cred}$ with the identity of the RP with which UE desired to perform authentication, UE is assured that no other RP received OpenID authentication information. The information piece $RP_{Cred}$ in $UE_{Assert}$ may be replaced by some explicit statement $RP_{Assert}$ generated by OPSF to denote the RP identity to UE. It may be assumed that $UE_{Assert}$ is a signed OpenID assertion message, signed with S.

Examples of what may be achieved are as follows:
- RP is authenticated to UE/$OP_{loc}$
- RP may perform OpenID authentication of UE/$OP_{loc}$ if it is the authentic RP identified by $RP_{Cred}$ (since then it is able to decrypt S).
- The unique UE/local OP which is authenticated in the protocol by OPSF to RP, is able to authenticate RP.
- The protocol flow may be unmodified from a local OpenID authentication. Also network authentication may remain unaffected. However, additional cryptographic operations may be used at all parties.

Figure 2:
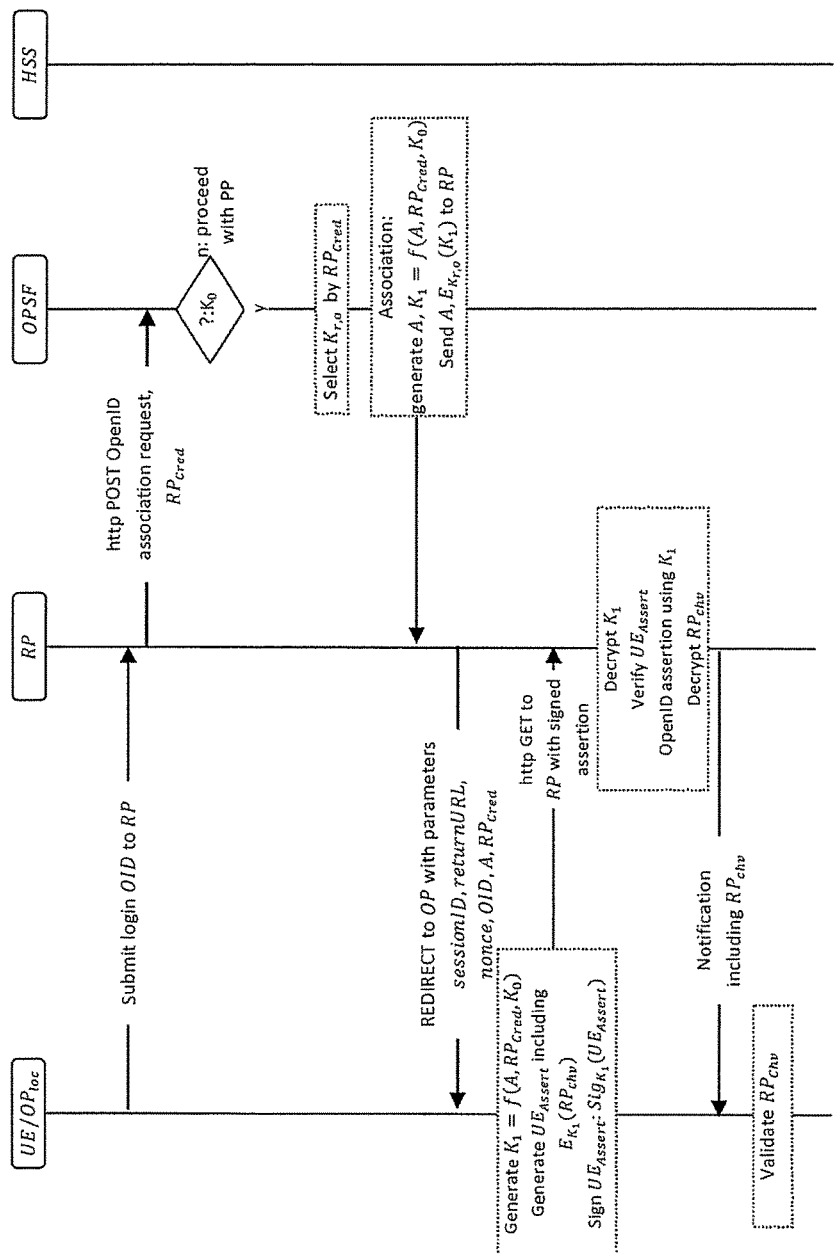
FIG. 2 is a flow diagram of an example protocol authentication phase.

As for an embodiment for interworking of a local OpenID with 3GPP Generic Bootstrapping Architecture (GBA), a simplified protocol can be obtained if a pre-shared secret $K_0$ between $OP_{loc}$ and OPSF exists. The following example protocol AP (Authentication Phase) illustrated by the message flow diagram of FIG. 2 may be applied in this case independently, or in conjunction with the protocol PP previously described for establishment of a shared secret. It is assumed that $UE_{Assert}$ is a signed OpenID assertion message, signed with $K_1$. Freshness of authentication is ensured by including a fresh challenge $RP_{CHS}$ in $UE_{Assert}$. UE/$OP_{loc}$ can validate the received $UE_{Assert}$ by verifying that it contains this challenge value, which RP may know if he is able to decrypt $UE_{Assert}$ with $K_1$. This in turn proves that RP is in possession of $K_{r,o}$ belonging to the RP identified by $RP_{Cred}$.

RP Authentication at the OP without Local OpenID (e.g., Using OpenID)

The inclusion of RP authentication in the OpenID protocol may include changes to the OpenID protocol itself as well as to the implementations of the OP and RP. Implementation on the UE for OpenID (or local OpenID) may not be affected by any such RP authentication. RP authentication may consist of a challenge response step between OP and RP, where the OP may send a challenge with a proof of freshness to the RP, e.g. via an encrypted nonce. The RP may use the pre-established shared secret $K_{r,o}$ to decrypt this nonce and/or return the answer to the OP (alternatively, the nonce may be unencrypted, and be signed by RP in its answer). The response to the authentication challenge may be as a direct response to the OP authentication challenge, or may be integrated in the redirect message, which may send the UE to the OP. In either case, the OP may have reliable evidence on the authentication of the before engaging in actual UE authentication. This may allow the stoppage of the protocol in the case of a failed RP authentication, and/or may save communication effort between the UE and the OP in the case of such a failed RP authentication. The OP may directly convey the information on the failed RP authentication to the UE. If the RP establishes an association with the OP, the corresponding steps may be modified to incorporate the challenge from the OP. During the association establishment the OP and RP may set up a message authentication code (MAC) key which may be used to sign the assertion message. This key may be sent encrypted using a temporary secret key which may be negotiated between the OP and the RP, such as by using Diffie-Hellman (DH) procedure for example. In addition to that key, which may again deviate from the OpenID specs, the OP may include a nonce, which may be encrypted with the DH-key, in the response to the RP.

The RP may decrypt the nonce and/or the MAC key based on the negotiated DH-key. The RP may use its own pre-established $K_{r,o}$ key to encrypt and/or sign the nonce as received from the OP and/or add it as an additional parameter to the redirect message which is sent to the UE. Since the UE follows the redirect to the OP, the OP may receive the encrypted and/or signed nonce. The shared key if $K_{r,o}$ may be used to authenticate the RP. In the case of a failed authentication, the OP may send an alert message to the UE to protect it from unauthenticated RPs. In the case of a successful RP authentication, the OP may proceed with the protocol.

Similar to the method described above, the OP may be able to send information to the RP, such as in the case where no association is established between OP and RP for example (e.g., stateless mode in OpenID). In the stateless mode, the information exchange between the OP and the RP may take place during discovery. However, it may not be guaranteed that the discovery involves the OP (e.g., in the case of delegated discovery) where the user identifier is for example at http://myblog.blog.com, and then points to the OpenID OP endpoint URL at my real OP at http://myblog-.myopenid.com. Hence, the OP at myopenid.com may not be involved in the discovery directly and may not be able to authenticate the RP at this stage.

If the OP is able to provide additional information during the discovery steps to the RP (i.e., the user identifier page is hosted at the OP itself), the OP may dynamically generate a nonce as part of the discovery information page and/or associate it with the URL (i.e., identifier) of the HTTP requesting RP. Analogous to the previous section, the OP may expect the RP to encrypt and/or sign this nonce and include the information in the redirect message.

Figure 4:
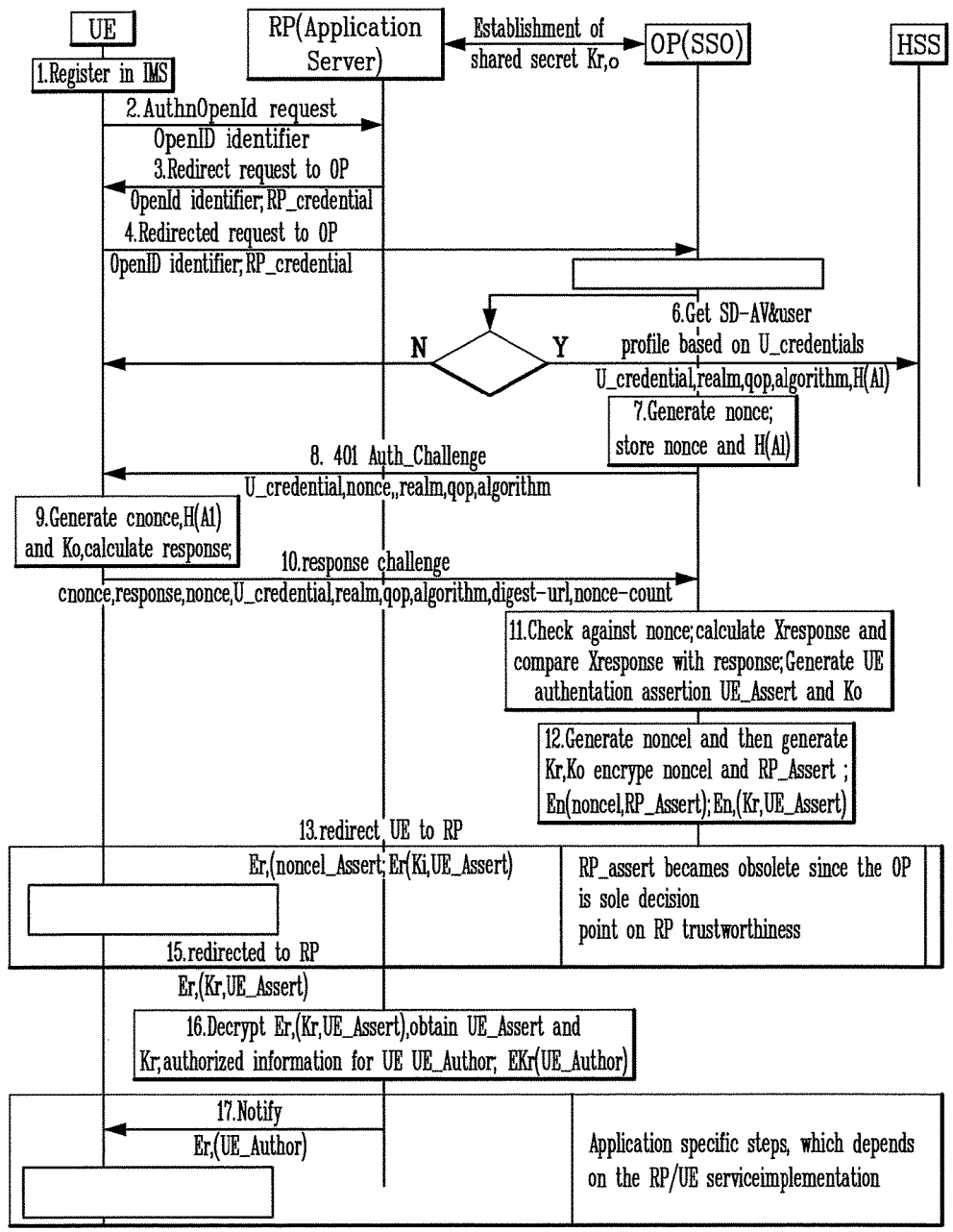
FIG. 4 is a flow diagram of an example protocol according to embodiments of the present disclosure.

It may be possible for the OP to force the use of HTTPS (i.e., the UE may be redirected to the use of HTTPS by the OP such that a subsequent communication between UE and OP may be protected). Such a protection may allow prevention of MITM attacks on the OpenID Auth_Challenge message from OP to UE. It may also allow sending of an alert message in the case of a failed RP authentication to the UE in a protected manner (e.g., this may occur after step 5 of FIG. 4, as described herein).

Figure 3:
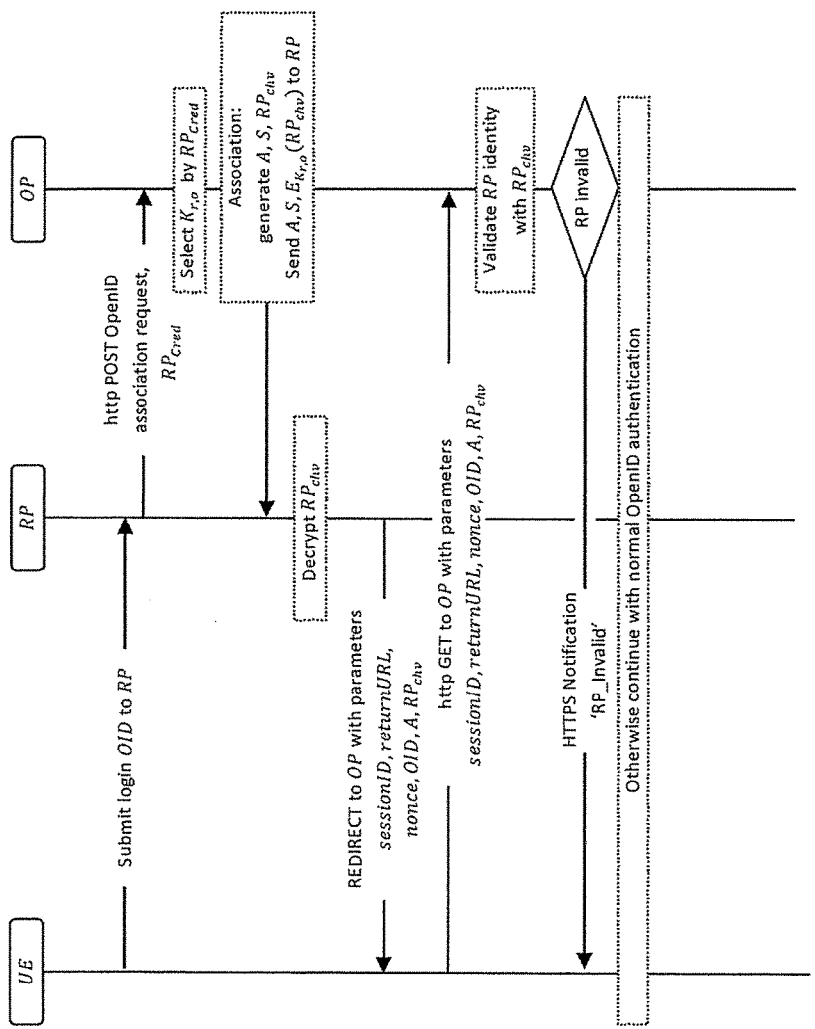
FIG. 3 is a flow diagram of an example initial part of the message exchange for RP authentication.

FIG. 3 illustrates a message flow diagram of an example initial part of the message exchange for RP authentication. In case of authentication failure, the OP may force HTTPS communication with UE and/or notify the UE of the failure. Otherwise, OpenID authentication may proceed as usual.

Embodiments for Split Terminal Case

The split terminal case refers to the scenario where two entities may reside on the user side. To stick to the original terminology from the OpenID/GBA TR, an Authentication Agent (AA) may perform the steps for authentication, while the Browsing Agent (BA) may be the 'viewer' or consuming entity of the service. One exemplary embodiment of this scenario includes a user that opens the browser to retrieve some service from an RP (e.g., website). The RP may perform some background steps with the OP (e.g., association or discovery) and the user's AA. The mobile phone may then be contacted by the OP. The OP and mobile phone may perform the authentication, as for example based on GBA (network) credentials, which may not be known to and/or not shared with the BA. The browsing agent (BA) may get access to the service at the RP, such as if the authentication between the OP and the AA was successful for example (there are multiple variants in the 3GPP Specification TR 33.924 (hereinafter "33.924")). In each variant mentioned in 33.924, there may be a channel between AA and BA, which may be either a local interface (e.g., Blue Tooth (BT), etc.) or a 'logic' channel created by the user entering something shown on the AA into the BA, such that the two sessions being logically combined.

If the Mobile Network Operator (MNO)'s own services (but no third party service provider's services) may be provided to the mobile phones, or to devices which are 'known' to the MNO, a split terminal case may be out of scope for the SSO_APS. If, however, MNOs want to enable users to connect different and/or multiple devices with a sole authenticator (e.g., the mobile phone) a split terminal case may be used.

The example options (such as from 33.924 for example) for the split terminal case may include those where a cryptographic binding between the two sessions is created (see the protocol flow figures from 33.924 in the section 4.4.2.4 of that document). These cases may be covered by the scenarios where the AA displays credential information to the user which the user may enter in the BA to authenticate towards the RP. As an alternative, the credentials may be sent over a secured local link between BA and AA. This variant uses the AA as an authentication token/password generator. It may directly be integrated with the protocol flow illustrated in FIG. 4. Steps 1-4 of FIG. 4 may be performed by the BA, the authentication steps 6-14 of FIG. 4 may be performed by the AA, the redirect to the RP is then done with the BA again. The BA may receive the EKr,o (K1,UE_Assert) from the AA and send it to the RP, which may be used by the RP to authenticate the user. A Split terminal case may also be set up with a local assertion provider, which may generate the UE_Assert inside the mobile device/AA.

Local OP-RP Secret Establishment

One exemplary embodiment for added security functions depending on an OpenID authentication based on local OpenID includes providing a private secret shared between the local OP $OP_{loc}$ and the Relying Party RP. This secret may be used, for example, to establish a private, secure channel between the local OP, or the trusted environment in which it resides, and the RP. Described herein is an option to bind a secure channel to a local OpenID authentication: Prior establishment of a secure channel between a UE platform and performing local OpenID authentication inside this secure channel. This exemplary embodiment may be sufficient for some use cases but may not meet the security requirements of others. For example, the UE platform which establishes the secure channel may be less secure than the trusted environment on which the $OP_{loc}$ resides (e.g., a smart card or another trusted computing environment). Private data coming from the same trusted environment and directed toward the RP may travel on an intermediate channel with lesser security. An alternative embodiment may allow the local OP and/or the trusted computing environment on which it resides and the RP to exchange secrets independently of the properties of the UE platform, and to bind such privacy properties of a message to the local OpenID authentication to the RP.

Figure 5:
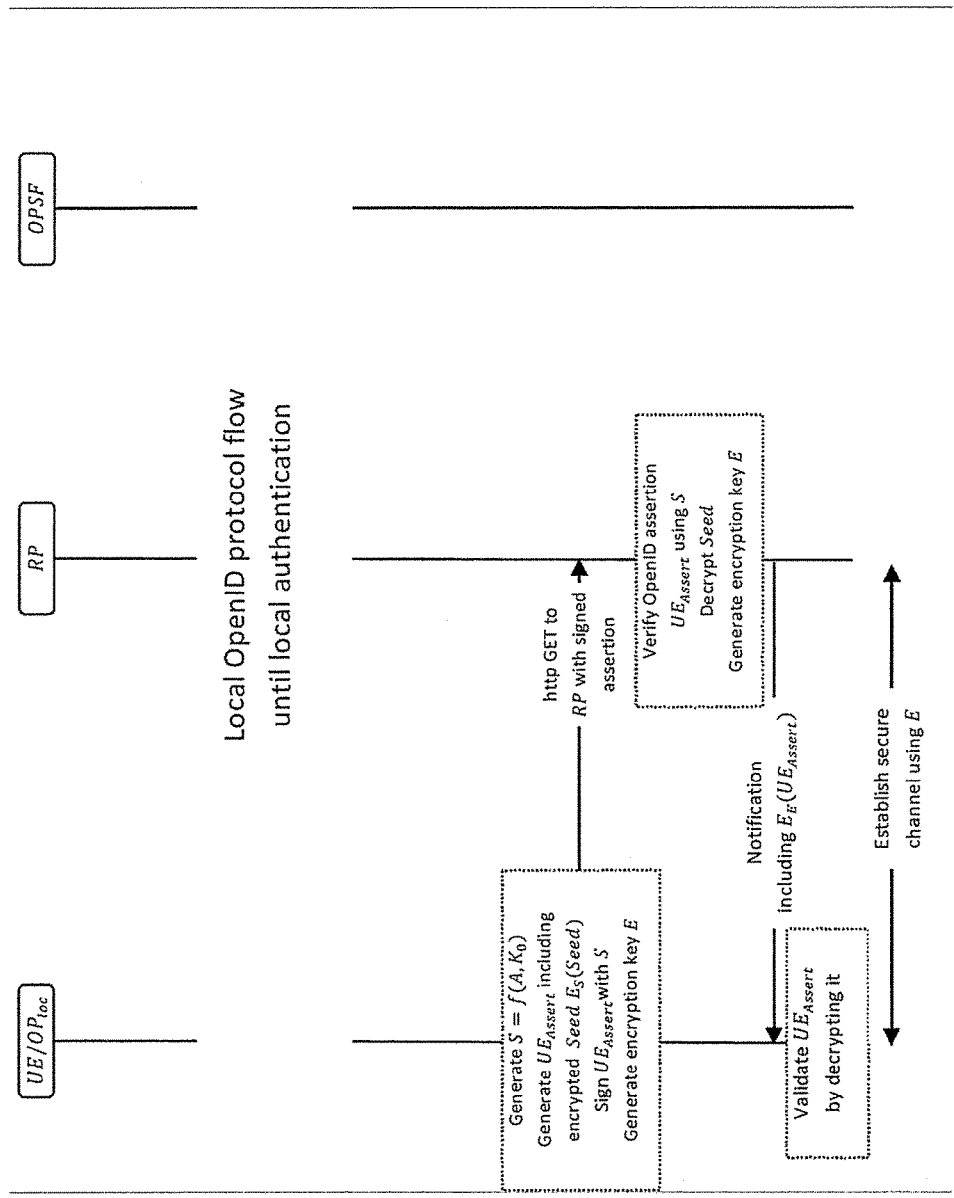
FIG. 5 is a flow diagram of a method in accordance with an embodiment of the present disclosure.

FIG. 5, illustrates a message flow diagram of a method in accordance with an embodiment of the present disclosure. As illustrated in FIG. 5, $OP_{loc}$ generates a signed authentication assertion. Additionally, $OP_{loc}$ encrypts a seed value Seed with the OpenID signing key S, which may be private to OPSF, $OP_{loc}$, and/or RP, or a key derived from S in a pre-determined way. Seed is a key generation seed value, for instance a random number or, more generally, an initialization vector for a secure channel protocol. $OP_{loc}$ may generate the encryption key E from Seed in a pre-determined way, which may be known to RP. E is a shared key generated from the seed value for encryption purposes.

The example embodiment described herein to derive a private, shared key between two parties from a seed is described as one example. Any suitable establishment methods may be used, such as the Diffie-Hellman method for example. These methods share some initial value—which may be called a seed—that may be transferred between the entities wishing to establish the shared secret. Such other methods may be inserted in the above protocol without significant changes in a straightforward engineering way. One trait of the method above is encryption of the seed which protects it from man-in-the-middle attacks. Another of the presently disclosed traits is the binding to the local OpenID authentication by the specific encryption with the OpenID signing key S, or a key derived from it. Another trait includes binding to the local OpenID authentication by the encrypted notification message, which also adds the feature of confirmation of the secret establishment confirmation toward the local OP.

When receiving the signed assertion, RP may verify it, decrypt the seed, and generate the encryption key E from it in a pre-determined way, known also to $OP_{loc}$. E may then be private to $OP_{loc}$ and RP. RP may encrypt the previously verified assertion with E and/or send it back to $OP_{loc}$. This may provide confirmation of secret establishment to $OP_{loc}$.

In another embodiment, the secret establishment may begin one step earlier in the local OpenID protocol flow by RP sending an encrypted seed, similarly as above, in the REDIRECT message to the $OP_{loc}$ (via UE example).

In another embodiment, the RP may be an intermediate node on the path to the endpoint of the desired secure channel. In this embodiment, RP may receive Seed from this endpoint (e.g, a server with which $OP_{loc}$ may wish to establish the secure channel and to which RP may act as an authentication and/or optionally as an authorization gateway). The method of secret establishment may be combined with a method for RP authentication.

In another embodiment, E may be used to establish an actual secure channel between the UE and the RP. The embodiments of secret establishment described herein may be combined with the embodiments for RP authentication.

UE-RP Pre-Established Secure Channel with Post-Authentication Key Confirmation

Figure 6:
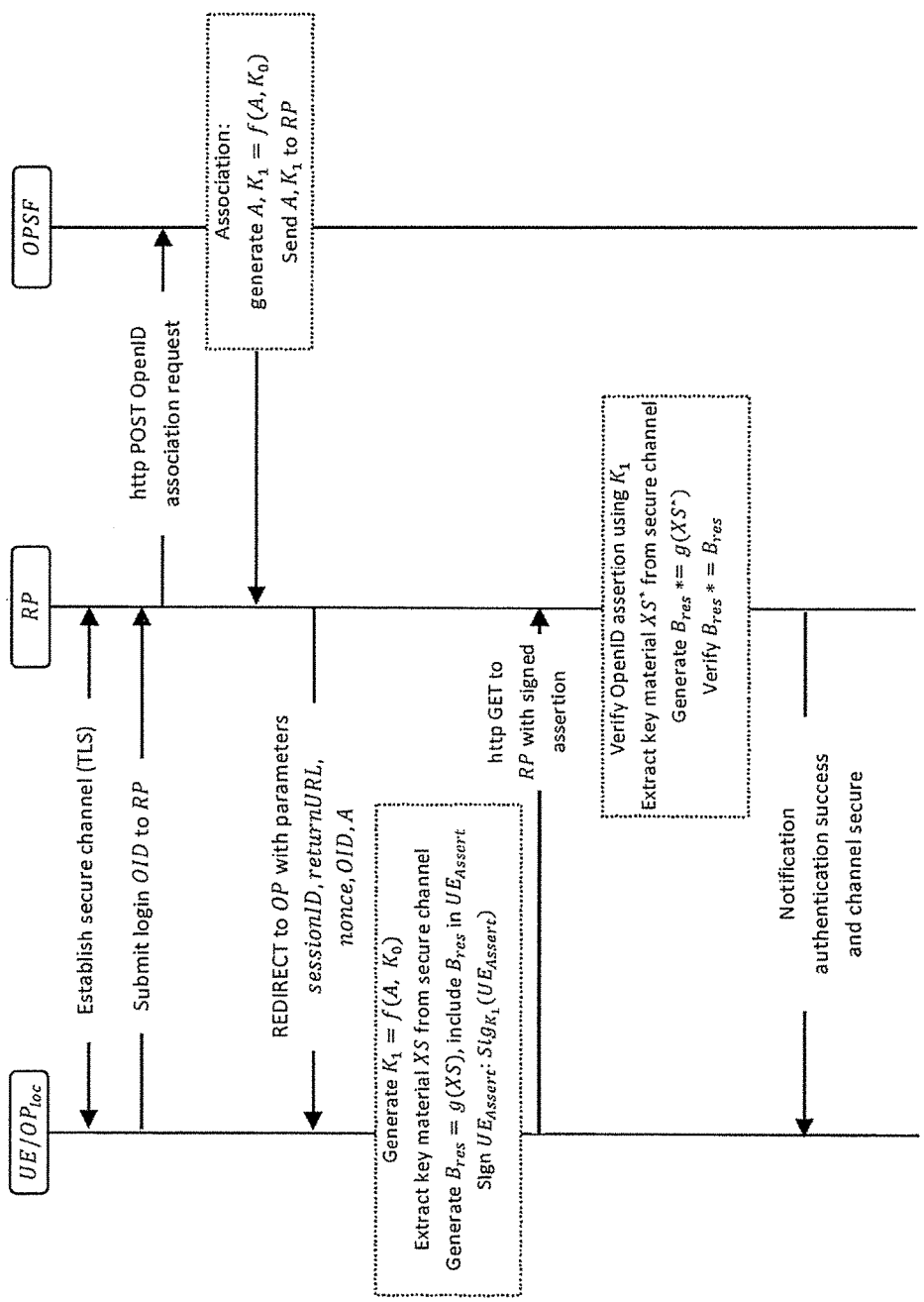
FIG. 6 is a flow diagram illustrating the establishment of a secure channel for local OpenID authentication.

FIG. 6 is a flow diagram illustrating the establishment of a secure channel for local OpenID authentication. For example, secure channel establishment may allow the UE and the RP to establish a secure channel, for example using TLS, and proceed with local OpenID authentication. The UE and the RP may conclude the protocol with a key confirmation procedure which may assure the RP that the authenticated (e.g., by the Open ID) party may also be the endpoint of the previously established secure channel. Exemplary features of this approach may include:

The use of the local OP as a trust anchor for the key confirmation, and the secure channel establishment, as well as the Open ID authentication. Embodiments attempting to achieve the same, or similar, security without a local OP (i.e., using standard Open ID) may incur additional communication steps between RP and network OP, at least.

Mitigation of the simple and/or advanced man-in-the-middle (MitM) attacks, such as the advanced attack in which the MitM establishes himself initially at the set-up of the secure (TLS) channel for example, as a TLS relay. The embodiments described herein may make the MitM explicitly detectable by the RP.

Embodiments described herein are used to confirm the secure channel keys toward the RP during authentication, and may be bound to authentication for example. This may be done by extracting key material XS from the secure channel, such as in the case of TLS using methods described in RFC 5705 for example, and/or deriving a Binding Response from it. The derivation of the Binding Response $B_{res}$ may be done by using a MAC algorithm with an additional nonce, such as the association handle of the Open ID run for example. The XS may not be used directly in the message to RP, since this may leak information on the secure channel to an attacker for example. $B_{res}$ may be included and/or signed in the Open ID authentication response. This may be done by using extension fields of Open ID specifications. When, after successfully verifying the authentication assertion from the UE, RP may derive a comparison value $B_{res}$* from the RP's owns secure channel key material and find that it coincides with the received $B_{res}$. The RP may know that the authenticated party is the secure channel endpoint, since it is in possession of the correct secure channel keys for the channel over which the authentication protocol was run—hence key confirmation of the secure channel keys.

If it is not desired to use an extension field of the OpenID authentication assertion, then XS may be used for key confirmation as follows. For example, OP_loc may derive a signing key $K_1'=g(K_1,XS)$ and uses it to sign the Open ID assertion. RP may do the same to verify the signed assertion. Upon success, RP may achieve authentication and key confirmation for the secure channel concurrently. This may come at the cost of reduced semantics, since presence of the MitM may no longer be discernible from failure of the Open ID authentication.

The embodiment described above, and illustrated in FIG. 6, may be combined with RP authentication described herein. For example, the assurance of channel security may be one-sided in the protocol described above. To make it two-sided, the aforementioned protocol may be combined with the RP authentication protocol described herein. For this, the $OP_{loc}$ may include the encrypted challenge value $E_{CHS}$ ($RP_{CHS}$) in the assertion message. If $K_1$ was never divulged to the MitM, the UE, upon receiving the notification containing $RP_{CHS}$, may assume that a valid RP has performed successful evaluation of $B_{res}$ and thus an MitM may not be present.

Binding to Network Authentication

Embodiments are described for binding local Open ID authentication with various forms of access network authentication. One implementation of the described embodiments may include combining, freely and without complication, binding local Open ID authentication with the UE-RP secure channel establishment and RP authentication described herein. Examples for the access network authentication may include AKA, GBA, IMS with SIP Digest authentication, and/or similar access network authentication methods.

An exemplary architecture model may be employed for the network authentication part of the system. For this, three stub entities may be employed, which may represent the latter part of the architecture model. These entities may be named and no acronyms may be introduced for them. In each application case to concrete network authentication methods, the entities may be mapped to the corresponding, standardized network entities.

A network authentication module on the UE may perform cryptography for the access network authentication, and may carry according credentials. This network authentication module may reside on a UICC, such as a USIM running AKA algorithms for example. The network authentication module may also be a soft entity, such as in the case of SIP Digest IMS for example.

On the network side, a network authentication function may be coupled to the OPSF. One function's purposes may be to interface with a network AAA entity. For this, an Open ID identifier may be mapped to a network identifier (e.g., such as an IMSI). For example, in the case of Open ID operation with GBA, as described in 3GPP TR 33.914 for example, this function may be performed by the NAF. NAF and OP may be co-located, which may save an interface definition for example.

The AAA Server may provide cryptographic material for the network authentication. This may be at least a challenge value (it may be implicitly assumed that network authentication is of challenge-response form) X_net, and the expected answer of the UE, Ans. In some cases the AAA Server may deliver additional information, or the Network authentication function may capable of calculating the authentication answer by itself. The material obtained from the AAA Server may be known as authentication vectors, AVs. The fetching of AVs may, in some network authentication protocols, not always be performed in each authentication run, but may be used in cases where the Network authentication Function is not by itself able to authenticate the UE. This may be described as bootstrapping in GBA, for example.

Coupling

Figure 7:
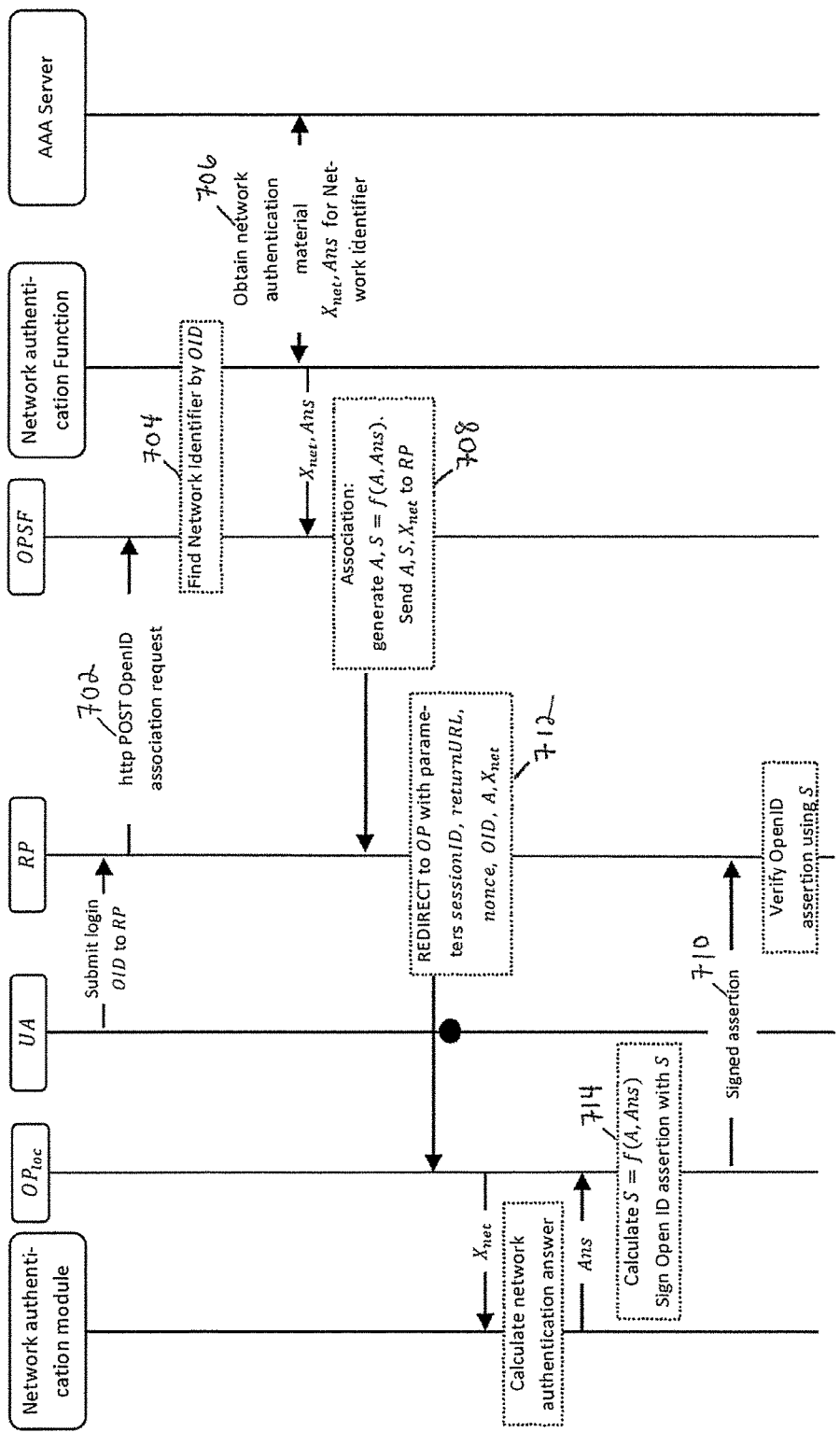
FIG. 7 is a flow diagram illustrating an example of coupling of local OpenID to network authentication.
Figure 8:
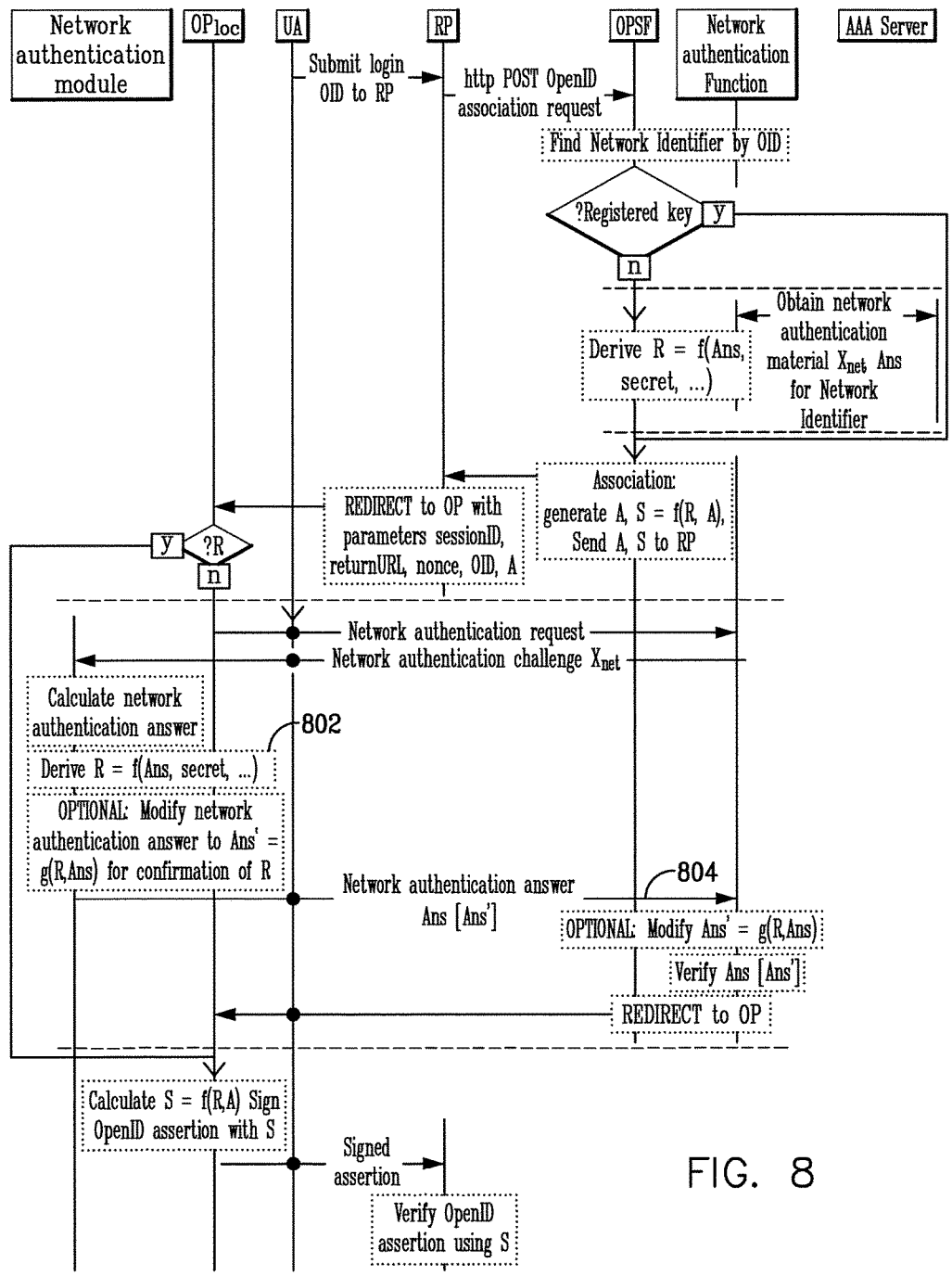
FIG. 8 is a flow diagram illustrating an example embodiment for local Open ID authentication using a registered key.
Figure 9:
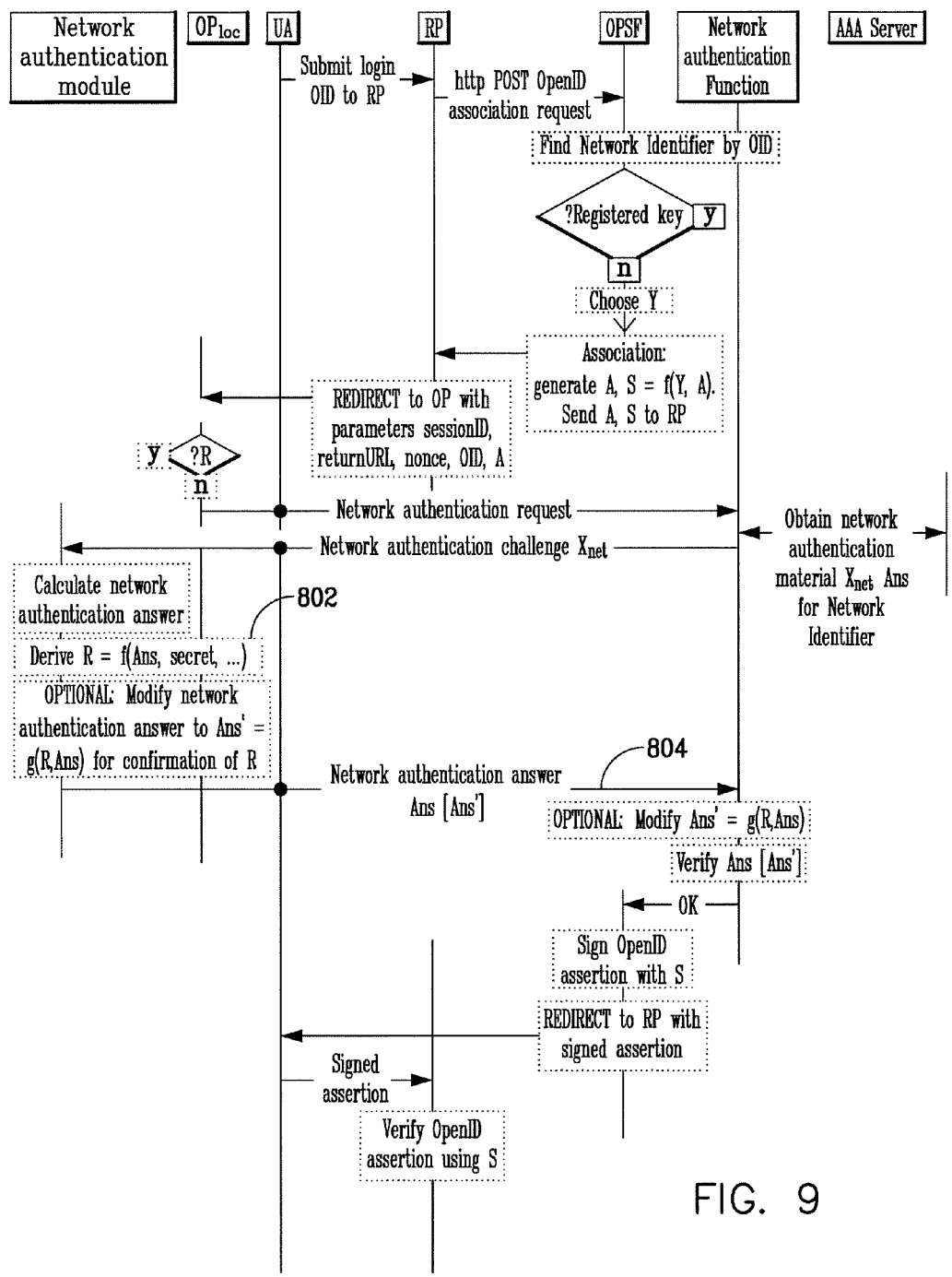
FIG. 9 is another flow diagram illustrating an example embodiment for local Open ID authentication using a registered key.

FIGS. 7-9 illustrate example entities involved in Open ID-network authentication coupling.

FIG. 7 is a flow diagram illustrating one example of coupling of local OpenID to network authentication. One form of coupling of local OpenID to network authentication is by delegation. This may lead to a 'waterfall diagram' as illustrated in FIG. 7.

The following is described in the context of a 3GPP operator AAA or HSS but, may be applied to other similar operator authentication architectures. After receiving the Open ID authentication request 702, the OPSF and the network authentication function may determine the corresponding UE identifier 704, to the network, (IMSI) and/or obtain authentication material (e.g., AV) from the AAA 706. The Open ID signing key may be modified to depend cryptographically on Ans 708. $OP_{loc}$ may sign the Open ID assertion 710 correctly, when knowing Ans, which it may have to obtain from the network authentication module on the UE. To perform these steps, the UE may receive the authentication challenge $X_{CHS}$ along with the Open ID REDIRECT from the RP 712.

For security, it may be desired for the Open ID signing key to depend not only on Ans, since in some network authentication runs this may be public information. For example, if the key derivation algorithm f is publicly known, then an attacker obtaining Ans may also derive the signing key S. Therefore, an additional secret may be included in the derivation of S 714. This may either be a shared master secret between $OP_{loc}$ and OPSF, or a secret which comes out of the network authentication (e.g., content encryption and/or integrity protection keys derived in the course of the authentication-and-key-agreement (AKA) run with the network). Such a network shared secret key may be used in conjunction with Ans, or replacing it, in the derivation of, which may then read S=f(A,network–secret).

It may be desired to not forward Ans to the OPSF. To avoid that, instead of Ans, a derived value Ans* may be created by the Network authentication function and be sent to the OPSF. Similar procedure may be applied at the device end, such as between Network authentication module and $OP_{loc}$ for example.

Examples for the network secrets which may be used may include AKA keys Ck, Ik, GBA keys KS_ext/int_NAF, and/or similar keys. These keys may be available at the UEUE when generating the network authentication answer. This may exclude key control by the UE in protocols described herein.

Exposure of either Ans or the network shared secrets outside a secure element (e.g., UICC) may be undesirable. The network shared secret, and eventually Ans, may be delivered from network authentication module to $OP_{loc}$ in an implementation-dependent manner.

One implementation may include the authentication answer Ans in the signed assertion in an extension field of Open ID, instead of modifying the Open ID signing key. In this implementation, Ans may be sent to the RP, such as for comparison with the received answer, which may not be desirable.

Key Registration

FIGS. 8 and 9 are flow diagrams illustrating local Open ID authentication using a registered key. A registered key may be used to decouple the network authentication from the local Open ID authentication.

According to one embodiment, a key R may be chosen according to policies from a key hierarchy. One example for a choice of R may be used in binding to GBA, where R may be realized as KS_ext/int_NAF. This may be the flattest key hierarchy in the case where network authentication by itself already yields a key with a certain lifetime which may be used for Open ID authentication. In another implementation of a key hierarchy with at least one more level of depth, an RP-specific key $K_{RP}$ may be derived from such a network authentication delivered key and take the place of R.

A registered key 802 may be derived if it is not available for the present $OP_{loc}$ and RP. Derivation may, according to one example, be based on the network authentication answer Ans. Additionally, it may depend on some shared secret, as described herein, since in the present case actual network authentication takes place and Ans may be transported over a network (e.g., the Internet). In each case R may be cryptographically bound to the network authentication run.

Upon receiving a valid network authentication answer 804, the network, (e.g., OPSF) informed by the network authentication function about the successful network authentication, may register key R for following local Open ID authentication sessions.

According to another implementation, if the network authentication is performed and R is derived, the association and Open ID signing key S may depend on the network authentication key material (e.g., Ans rather than R). Although this may be admissible from a protocol viewpoint, it may not be advisable since it omits the property of key confirmation of the protocol, namely proof to RP of the fact that $OP_{loc}$ is in actual possession of its own copy of the registered key R.

Messages may contain additional information to identify or select the appropriate registered key. Messages may also contain additional policy directives, such as to force decommission of current and registration of a another registered key for example.

After receiving the network authentication request from the UE, the OPSF and the network authentication function may map the received network identifier (IMSI) to the used Open ID identifier to find the currently active authentication session and key R which may be registered in this session.

As an optional implementation in key registration, OPSF may bind the network authentication answer to the key R to be registered in this session, either by modifying the answer from Ans to Ans* using the key R in some way, or by adding an additional piece of information which binds the network authentication answer to the registered key.

The optional implementation in key registration described above may be redundant in some ways. For example, since the Open ID signing key S derivation may already depend on the generated registered key R, which in turn may be bound to the network authentication, the signed Open ID assertion may already carry the information that the key R was correctly derived and may be present at $OP_{loc}$, which may be the semantics of key confirmation. In the protocol, key confirmation may take place toward the RP, which may signal success to the network. If the RP is trusted, it may be advisable not to use the optional implementation in key registration described above. The automatic confirmation of the registered key in the presently described protocol may be a distinctive advantage of it over other options or protocols. Cooperation of the $OP_{loc}$ network authentication module in the UE may be implementation dependent.

Registration embodiments illustrated in FIG. 8 may include direct binding of local Open ID authentication to network authentication with a registered key for system decoupling. It may have a slight modification of the Network authentication function, such as if the registered key is not present for example. The Network authentication function may request an authentication vector from the AAA backend. It may do so without having received a network authentication request from a UE. This may be a deviation from its other functions. If such a deviation is not possible, another method may be applied which uses an unmodified network authentication run inside the Open ID flow, as described herein. This may be illustrated in the flow diagram of FIG. 9, which may be similar to a generalized flow version of the Open ID/GBA combination with a local Open ID provider for example.

Example Combined Use Case—Multi-Tenant Capable Cloud Access from Private Devices An example embodiment described herein combines many traits and technical features of the local OpenID, with other features. For example, local OP authentication, RP authentication, secret establishment, and/or enrollment procedures may be used. According to one example, at least two aspects of outsourcing for computing resources of an organization may be combined. First, the modern workforce class of remote, external, mobile, and/or field workers may entice organizations to make use of these workers private devices for work purposes. Second, information and/or computing resources may be increasingly outsourced to computer clouds (i.e., multi-tenant hosting infrastructures). The outsourcing organization's security uses in this 'dual outsourcing' scenario may set constraints on the security architecture chosen for its implementation. These may be described in terms of protection goals and/or security controls which may be used to protect the organization's assets.

The user device may be considered insecure. Even if full protection of the corporate data may not be possible on such a device, the organization's data may at least be additionally secured in the cloud storage, such as to prevent data loss and/or leakage through user devices, to the extent possible, for example. One way to do this may be to allow cloud access via a remote desktop application which may connect to a virtual workstation in the cloud. As a benefit, this may allow remote workers to use a different operating system. For example, the user device may be a tablet running Android or Apples iOS, and connecting to a MS Windows™ virtual machine via some RDP client app. User authentication may be secured by hardware protection measures (e.g., bound to a smart card). According to one embodiment described herein, a smartcard may be issued to the user of the user equipments that is enabled with local OpenID. User accounts may be enrolled.

The cloud host may provide some security controls and/or contractual guarantees by itself. Nevertheless, the organization may establish further, independent security control as against data loss and/or leakage in such a multi-tenant environment. As an example, the organization's IT department may install a disk encryption solution for the hard drives (e.g., virtual hard drives) of the cloud workstations.

The protection offered by a disk encryption on cloud computers may be limited. The cloud host's hypervisor may have full data access while the virtual workstation is in operation. It may also listen to the sent credentials used to decrypt the hard drive, such as when a user logs on to the workstation for example. Therefore, it may be desirable to bind the disk encryption in some way to the hosting hardware, such as by using Trusted Computing based virtualization support technology for example.

Figure 10:
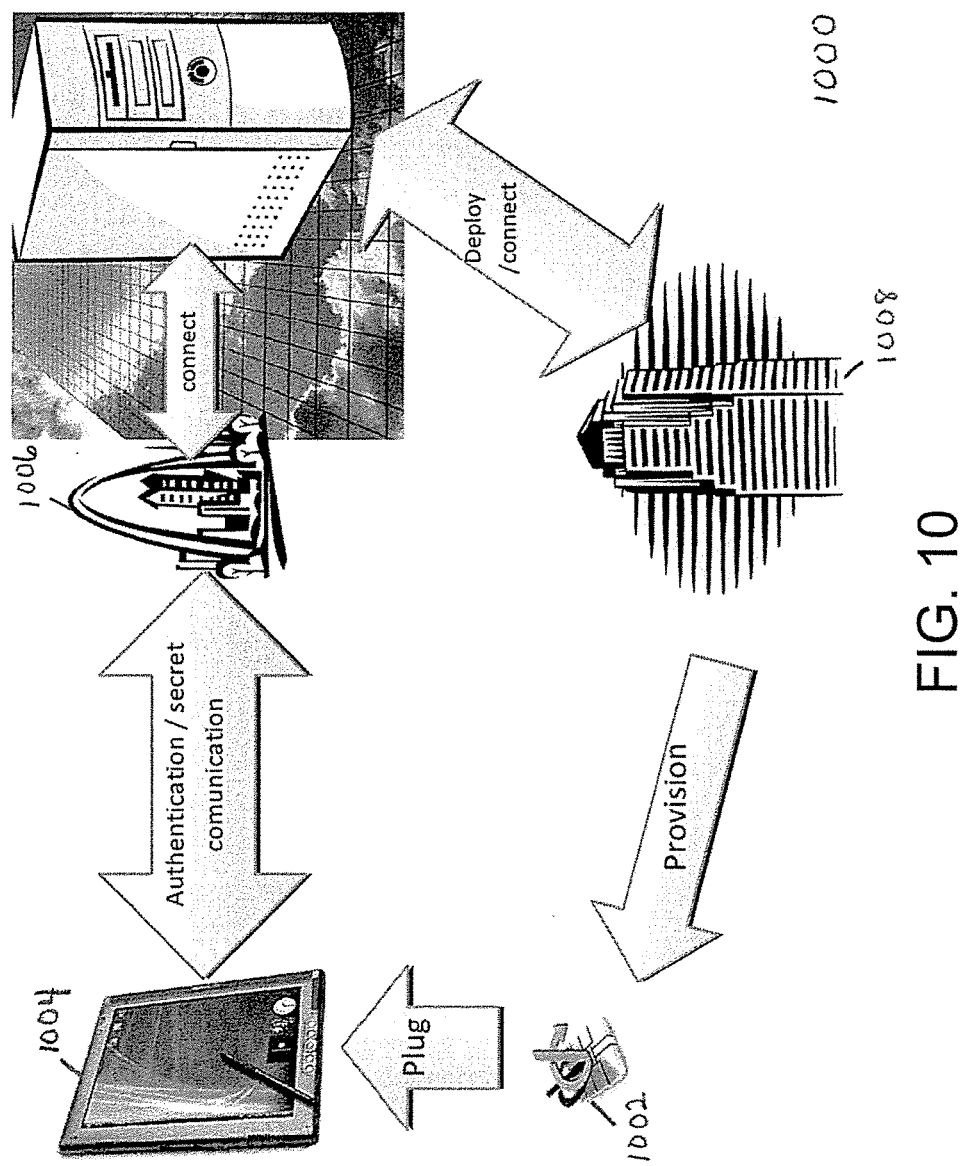
FIG. 10 is a diagram illustrating an example system according to an embodiment of the present disclosure.

The remote user device may submit some secret data, such as a disk encryption credential (e.g., a password) to the virtual machine in the cloud for example. Such data may be protected to reach its destination secretly, and it may not be known to the user. It may be chosen, in an example embodiment described herein, to secretly store this credential also on the smartcard enabled with local OpenID, such as in a way that it is transferred to the designated virtual machine for example. FIG. 10 is a diagram illustrating an example system 1000 according to an embodiment of the present disclosure.

As illustrated in FIG. 10, the user may obtain a local OpenID-enabled smart card 1002 from a company (i.e., a smart card bearing a local OP). The smart card may also contain a credential vault for private access to the company resources 1008 hosted elsewhere, such as in the computing cloud for example. The user may insert the 'smartOpenID' card (e.g., a smartcard that is enabled with local OpenID technology and may perform local OP (OPloc) functions) into the user device 1004 (e.g., a tablet) and some apps may be installed, among them may be an RDP client to access the remote desktop on the cloud hosted VM.

The login to the remote desktop may be mediated through a Web-based gateway 1006 which acts as a Relying Party for the smart OpenID authentication procedure. This RP may reside in the cloud and/or be offered as a security service to the outsourcing companies, and/or the RP may be operated by a company. The gateway RP may have a secure, private connection to the hosted VMs. The local OpenID-based log-on may use one or more security features, such as:

- Authentication of a user via local OP, providing (at least) two-factor authentication by way of possession of the smartOpenID card and/or knowledge of an authentication secret, or biometric user authentication for example.
- Authentication of the RP (the security gateway) to the smartOpenID local OP and by that to the user to ensure that the user connects to the designated corporate resource, rather than a spoofed site for example. Credentials for RP authentication may also be contained securely in the smartOpenID card.
- Establishment of a private secret, end-to-end between smartOpenID card and RP, and optionally delegated further to the cloud hosted VM.

When the secret is established between the local OP and the RP, respectively the cloud VM, the credential vault on the smart card may be unlocked and the credentials for data access on the cloud VM may be encrypted with the established secret (on card) and/or submitted to the cloud VM. There, it may be used to decrypt user data. The user may then work on the cloud VM via the remote desktop application. Additionally, the user may have access to corporate resources via a secure connection from the hosted VM to the corporate Intranet.

Use of OpenID Identifier Select

Described herein are embodiments for the OpenID identifier select and its use in the scope of the local OP concepts. The integration of identifier select is also described herein (e.g., the use of a Smart OpenID button at the service provider).

OpenID may allow the use of 'OpenID Provider driven identifier selection.' This introduces a flow to OpenID which may allow users to enter the URL of their OpenID Provider (OP) (e.g., openid.novalyst.de) at a consumer website (i.e., a relying party service) instead of entering their full OpenID identifier URL (e.g., openid.novalyst.de/id/sam). The consumer site may start the OpenID authentication flow with the OP (i.e., it may perform discovery and/or association steps) and/or redirect the user to the OP for authentication. The user may authenticate to the provider and/or select a particular OpenID URL from the OP. The correct response (e.g., signed assertion) for this OpenID identifier URL may be passed to the consumer site.

The URLs that the user may choose from may depend on the service provided by the OP (e.g., the OP may allow users to create multiple URLs) representing different personas or profiles. For example, there may be a URL (e.g., openid.novalyst.de/id/sam-work) which is used for work and/or business related services, while another URL (e.g., openid.novalyst.de/id/sam-private) may be used for private use.

Figure 11:
FIG. 11 is a screenshot illustrating an example embodiment of a website with multiple OpenID providers (OPs)
Figure 11:

FIG. 11 is a screenshot illustrating an example embodiment of a website 1102 with multiple OpenID providers (OPs). OpenID may specify that the OP is responsible for the user having to decide on which identifier to use with that consumer site 1102. The consumer site 1102 may get the selected identifier URL in the signed assertion message, so the consumer site 1102 may know the person that just logged in.

This use of OpenID may enable consumer sites 1102 to engage in the OpenID authentication process, without having to ask users for their full OpenID identifier URL (which they might not even know or be aware of), but the consumer site 1102 may present an OP or list of different OPs, that the user may choose from. This may be used as illustrated in the screenshot of FIG. 11. For example, a user may login using their Google account by selecting the Google button. When the user clicks the Google button an OpenID run may be triggered. The user may be redirected to Google to proceed with authentication.

The OpenID Provider driven identifier selection is a method that may allow a user to enter the URL of the OpenID provider into an OpenID field instead of the full OpenID identifier URL. After a successful authentication run, where the user selects an OpenID URL at the OP, the selected OpenID URL may be returned to the consumer site.

Figure 12:
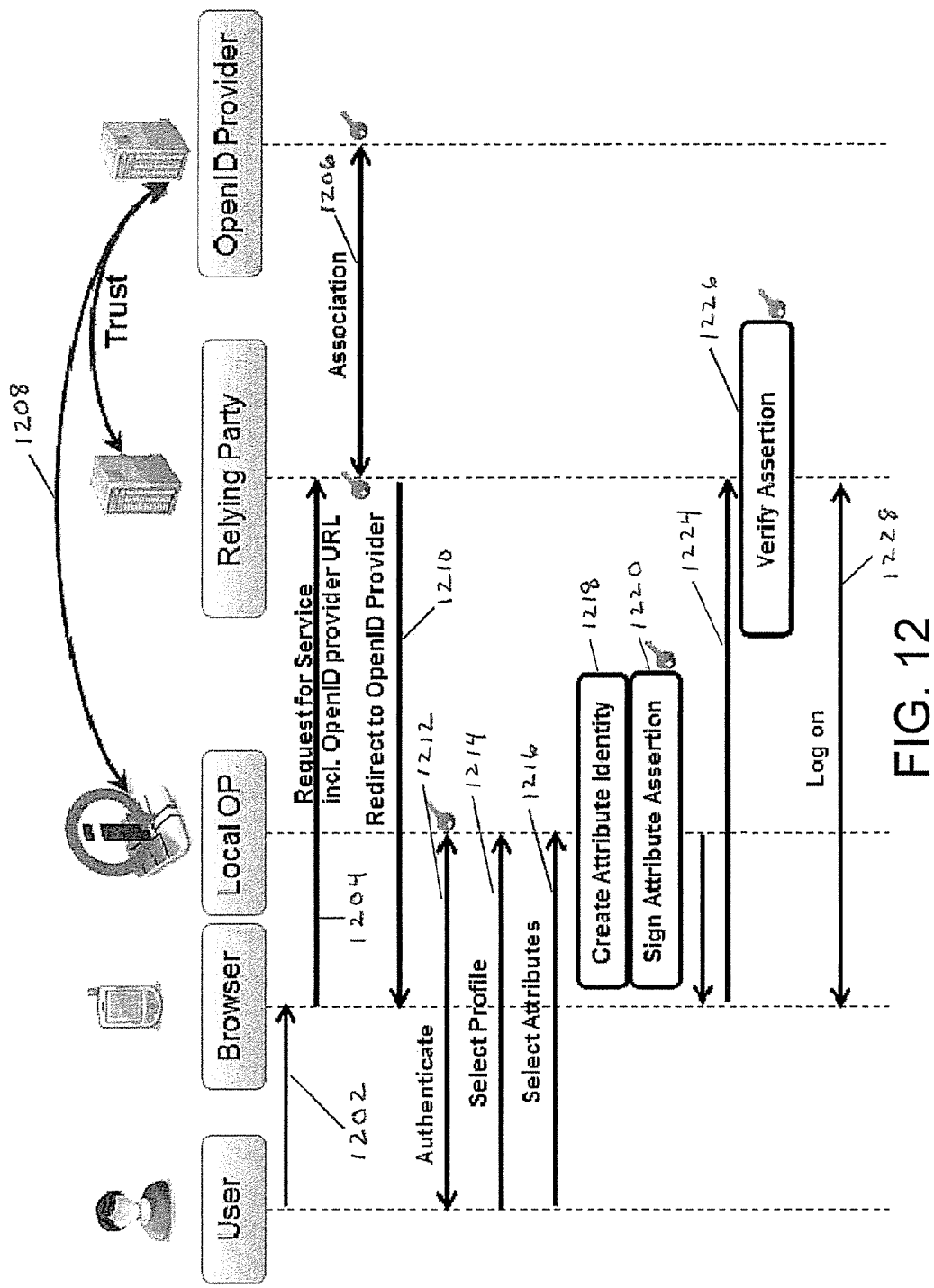
FIG. 12 is a flow diagram illustrating an example embodiment for using identifier select with local OP.

The method of identifier select may be integrated into the concept of the local OP. FIG. 12 is a flow diagram illustrating one embodiment for using identifier select with local OP. As illustrated in FIG. 12, a User may go to the consumer site 1202 and decide to log in 1204 using OpenID. The User may provide the URL of the OpenID provider (e.g., openid.novalyst.de). This URL may be provided by directly entering it into the OpenID login field. Alternatively, this may be done automatically by an OpenID button, which the consumer site may provide for the purpose of OpenID login with an OpenID provider. The button may be used to select the URL of an OpenID provider (e.g. one button per OpenID provider), providing a one-click approach to select.

The consumer site may initiate the OpenID protocol with the OpenID provider on the internet (i.e. the OPSF). In an exemplary embodiment, the request field openid.identity may be set to "http://specs.openid.net/auth/2.0/identifier_select" as per OpenID, when using identifier selection. In the association phase 1206 of the OpenID protocol, the OPSF and consumer site may exchange the shared association secret which may be used to sign the assertion message. The derivation of this secret may be according to the descriptions of the local OP provided herein. The association secret may be derived from the association handle and/or a long-term shared secret, acting as a trust anchor, between OPSF and local OP instances.

For this protocol implementation, local OP instances may be equipped with the same long-term shared secret 1208, which may be shared between OPSF and local OP. Since the OPSF may not know which user is going to authenticate to his/her respective local OP at the time that the consumer site initiates the association, one secret for the whole domain may be used. For example, any (e.g., local) OP which may issue assertions for identifiers (e.g., openid.novalyst.de/id/xyz) may have the same secret and this secret is known to the OPSF (e.g., at openid.novalyst.de) and may be used at the time of the association to derive the association secret. Alternatively, additional information elements may enable segregation of the users or identifiers.

Although a common long term secret may be shared between an OPSF and local OP instances, this may not be the only implementation. For example, according to another implementation, the OPSF may create group keys 1214 which may be shared with local OP instances, which may belong to users of that group. A group may include users or subscribers that share the same, or similar, identity attributes 1218 (e.g., members of the group may be over 18). The group key may be enabled/enrolled in local OP instances of the subscribers belonging to that group. This may allow them to create assertions for this attribute. According to another embodiment, cryptographic methods may be employed, such as group signature schemes that may achieve a distribution of group keys.

The local OP may not sign and/or create an arbitrary OpenID identifier URL, which may not be allowed by the network or operator of the OPSF for example, when it gets the redirect from the OPSF/RP. This may be ensured by the operator of the OPSF, since the local OP entity may be controlled by the operator in the sense that the local OP application is rolled out and/or installed by this same operator and may, for example, be equipped with a pre-installed list of identifiers the user can select from. Such a list may be securely stored on a smartcard or cryptographically bound to the smartcard, such that the operator may use smartcard OTA mechanisms to update, modify, change, and/or enroll this list of choices. Other implementations for the installation, creation, and/or update of this list may also be used. Such implementation may be carried out in a secure manner and/or prevent the end user from modifying the list.

After the establishment of an association (and thus an association secret between OPSF and consumer site), the consumer site may redirect the user's browser to the URL of the OpenID provider 1210, which may be resolved to the local OP entity in the device, as described herein. The local OP may receive the authentication request 1212 from the consumer site through the redirect message and/or may detect that the openid.identity field is set to a value (e.g., "http://specs.openid.net/auth/2.0/identifier_select") indicating that OpenID identity provider driven identifier selection is to occur.

The local OP may load a list of allowed identifiers and/or present them to the user, who is requested to pick an identifier. The user may not be able to modify this list. The user may be able to select an identifier presented in this list. The user may not be able to make the local OP sign an assertion for an arbitrary identifier URL.

Several other implementations may be applied, instead of the local OP loading the list of allowed identifiers and presenting them to the user. For example, the selection variants may be restricted to a subset of the available identifiers, depending on different conditions (e.g., type or URL of consumer site, time, last user preferences, various policies, such as provider, operator, and/or corporate policies for example, type of service desired from the consumer site etc).

According to an example, the user may have at least two identifiers enabled in the local OP. One identifier may be a work identifier (e.g., 'sam-work') and the other identifier may be a private identifier (e.g., 'sam-private'). The user may also, or alternatively, have other identifiers enabled (e.g., a generic 'sam'). As an example, the user may log into a service which allows the user to send text messages to phones. Since the user has connected the user's work identifier (e.g., 'sam-work') and private identifier (e.g., 'sam-private') with this service site, the user may decide to log in using either the user's work or private identifier. The local OP may use the redirect_to field of the OpenID URL to determine that this is a login to a service and thus 'hide' those identifiers that are not related to this service (selection based on consumer site). If the user wants to log in using an identifier that is unavailable according to predetermined settings, the user may be denied the option of logging in using the unavailable identifier. For example, if the user would want to log in on a weekend, the user may not get the option to log in using the user's work identifier (e.g., 'sam-work'), since billing should then go to his private account.

Other scenarios like the OpenID authentication to MNO provided WiFi hotspots may be enabled, where different identifiers may be used to represent different subscription models, or the like. Depending on the identifier, the consumer site (e.g. the WiFi AP) may provide different services. For example, the local OP may receive an AT&T_AP_generic identifier and may also purchase an AT&T_AP_gold identifier. When the local OP wants to log on to an AT&T WiFi AP, the local OP may select between the generic identifier allowing standard internet connection with some restrictions (e.g., limited time, limited data, no VoIP, etc.), or the local OP may use the gold identifier, which may allow for additional services (e.g., VoIP, P2P, video, etc.). Different identifiers maybe combined with different local authentication schemes towards the local OP.

After the user selects an identifier, the local OP may request authentication from the user. This may be any type of authentication, which may take place locally between the local OP and the user for example. The local OP may store the local user authentication for a certain period of time, so that the user does not have to re-enter the local authentication credential again. The local OP may request a re-authentication based on a timeout of the single-sign-on session, or other events, such as location/network cell change, wake from standby, movements of the phone (e.g. flip phone screen down to lock SSO again even if timeout did not yet occur, etc.), or driven by other user and/or operator defined policies which may need a local re-authentication of the user towards the local OP.

Based on the association handle and the stored long term secret, the local OP may calculate the association secret. The local OP may sign the assertion message 1220 including the selected identifier using the association secret and/or redirects 1222 the user's browser to the consumer site 1224. The consumer site may autonomously verify the assertion signature 1226 and may provide service to the user based on the presented identifier. Since association mode of OpenID may be assumed in this description, the RP may (e.g., as per OpenID) not contact the network OPSF again. This may allow the user to log in 1228 to the service without disclosing the identifier that has been used. The OPSF may get to know that any local OP enabled subscriber/user is about to log in to the consumer during the association phase, but the OPSF may get no indication about the selected identifier. The procedures described herein do not preclude use of other modes of OpenID (e.g., other than association mode) from being performed.

Figure 13:
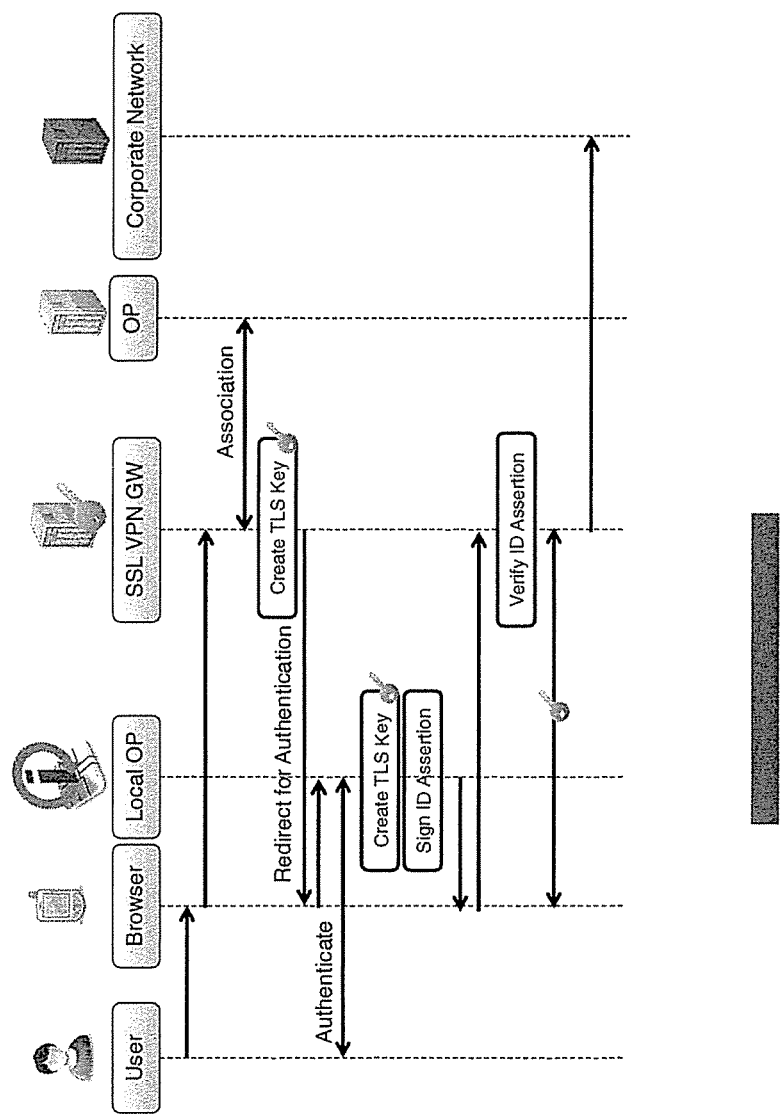
FIG. 13 is a flow diagram illustrating an example embodiment for establishing secure corporate network services using local OP.

FIG. 13 is a flow diagram illustrating an example embodiment for establishing secure corporate network services using local OP. As illustrated in FIG. 13, corporate network services may be provided over a secure VPN connection (e.g., a web portal or SSL-VPN). OpenID authentication may be integrated into the web portal (e.g., SSL-VPN). With smart OpenID, the authentication may be bound to the smart card, and VPN SSL/TLS credentials may be derived from the OpenID authentication. The local OP application may act as a proxy for authentication. The local OP application may act as an enabler for SSL-VPN with locally generated and/or managed keys. Multiple business models may be possible by establishing secure corporate network services using local OP. For example, an IdM system may be operated by the corporation who issues smartcards (e.g., secure SD) with a local OP function to their employees. Additionally, or alternatively, the IdM system may be operated by the MNO, and the company may have a contractual agreement with the MNO to delegate authentication.

As the protocols described herein may not include feedback to the OPSF after the user selects an identifier and is authenticated towards the local OP, the selected identifier may not be disclosed to the network (e.g., OPSF). By using embodiments described herein, privacy maybe enabled for users. For example, the OPSF may get to know that a user of the group of local OPs sharing the same long term secret (e.g., sharing the same URL basename, such as openid.nova-lyst.de) is about to log in to the service but not the user. In a normal OpenID protocol, without the local OP acting as a proxy entity for the network, the network OpenID provider may know which identifier the user selected. With the split architecture, the network entity may know that an OpenID authentication is taking place with that service, while the local OP entity on the device may get to know the identifier that the user selects.

With the use of identifier select and local OP methods, some characteristics may be similar to a role-based access control (RBAC) scheme. Different roles that a user may take may be represented by the availability of the OpenID identifier at the local OP. The control of the roles is distributed between the network (OPSF) and the local OP entity. While the network may centrally manage, create, and modify the roles, by installing, updating, and/or removing them from the installed local OPs of single users, the local OP entity of a single user enforces that the user may select an identifier or a set of identifiers, as defined in policies which are created by the network (OPSF).

With the use of a local OP, such policies may include data which is locally stored or available on the device (e.g. personal information such as age or address, cell id, battery state, location, signal strength, etc.) without the need to communicate that data to the network since the policies may be evaluated locally by the local OP acting as an authentication proxy for the network.

The provisioning of user specific policies by the network to the respective local OP applications of the user may be possible through the inherent identity provided by the subscriber identity, which may be used for the OTA provisioning of identifiers and/or policies. For the creation of groups, it may be possible for the operator to enroll an identifier to multiple local OP applications.

Different services may be provided to users based on the OpenID identifier that the user presents. Multiple users may share the same identifier (e.g., for a corporate WiFi AP, there may be an identifier business.com/openid/wifi-guest which allows the authenticated device to browse the internet, while the business.com/openid/wifi-employee identifier, available in all local OP installations of employees allows access to restricted company information). The use of this identifier could, for example, be restricted to be used with the WiFi APs of the company. The identifier may be used when the user's device is in a location in a certain timeframe (e.g. in an office building during business hours). In comparison to other RBAC systems, the policy may be evaluated by the local OP, without having to transfer the data (e.g. location, time, etc.) to the network. The WiFi AP may not have to evaluate policies. It may rely on the trust derived from the OpenID provider, which may be expressed by the authorized use of the OpenID identifier by the user. For example the WiFi AP may not need to get the device location, since its access decision may be solely based on the OpenID identifier.

Services may not have to evaluate and implement policies, and may not have to be updated with these policies. However, they may implement the mechanisms to provide different services based on the presented OpenID identifier. Services may retrieve instructions on how to handle different identifiers from the OpenID operator (e.g., OPSF) or may create an access profile for different identifiers. Optional services, to preserve privacy, may not report back to the network the identifier used. For example, in the case of fraudulent use, the services may use a log of identifiers used and at least report the incident to the OPSF. The information carried may contain the identifier and association handle, as well as time of login for example. The OPSF may take appropriate action. In the case of identifiers which are deployed to multiple devices (e.g., as in the WiFi example described above), the OPSF may revoke the whole group identifier.

The network (e.g. OpenID provider or OPSF) may manage the available identifiers on each user's device/local OP remotely, by enabling or disabling the use of identifiers (e.g., using OTA management of the local OP app). Identifiers may be bound to identifier policies, created by the network, and/or deployed to the local OP in the devices, such that the policies control the use of certain identifiers in a certain context. The network may be able to distinguish the different users for the enrollment of identifiers and policies by their subscription identity. Using identifier select, the OPSF may not know which identifier the user selected to access the service. The network and/or OpenID provider may provide services with the identifiers they have enrolled to devices.

The list of available identifiers in the local OP may be remotely managed by the network. The local OP may be able to store and/or evaluate policies which are associated to the available identifiers (e.g., to make them available to the user for selection if specific conditions are met). The device and/or local OP may autonomously create and/or sign the assertions and send them (e.g., via redirect) to the service, which may in turn evaluate the assertion autonomously and/or provide access. The local OP may decide on whether an identifier may be used in a specific context. The local OP, although it may be able to, may not provide feedback to the network on the identifier used with this service. The local OP may be programmed to inform the operator, network, and/or OPSF of the identifier used for an authentication or to keep a logfile of authentications being performed, including the service URL, the chosen identifier and/or the association handle for example. In the case of fraud, the operator, network, and/or OPSF may retrieve this logfile and take appropriate action. According to one embodiment, he logfile may be encrypted. There may be an option to implement a four eye principle encryption/decryption, to protect user privacy.

The identifier select may be used in conjunction with local OP. According to one example, a user/subscriber may have registered/purchased a set of identifiers from the OpenID operator, which may be the MNO of the user for example. At least the work and private identifiers (e.g., 'sam-work' and 'sam-private' respectively) may have been enrolled onto the local OP application in the end user's device.

The use of the identifier select method allows services (e.g., the WiFi AP) to present a single login button on their webpage. When the user clicks that button, the service may perform the identifier select OpenID run and the user may use the local OP for authentication. While this example is a straightforward implementation of the identifier select option, it may allow services to easily integrate a 'one-click' user experience for authentication.

Since services may display one button per MNO/OpenID provider (e.g., as with Google, Yahoo, Facebook, etc. buttons), it may be desirable to have a single button, which indicates to the user that the user can use the local OpenID login method provided by the user's MNO. This may, for example, be accomplished if the browser and/or device transmit sufficient information to the service, such that the service can determine the correct MNO and thus display the single option of using the user's MNO. Where this information is not available to the service upon first visit, the service may store a cookie in the user's browser to store the information on the MNO providing the local OP login. Since this information is available to the service after first user authentication it may be stored for all subsequent visits of the user to this service, allowing the service to display the relevant login button. Based on this cookie information, the service may attempt a hidden OpenID login (e.g., using a hidden iframe in the homepage). When the user then visits the page, the iframe loads the code to establish an association with the OPSF and trigger an OpenID authentication run. The user may see the login screen of the local OP after visiting the service site, where the user can confirm or deny the login or select a different identifier.

Different identifiers may be linked to different profiles and/or personas with the service. Considering the exemplary embodiment of a WiFi AP which may use OpenID authentication for login, where the user may get full, non-firewalled access to corporate services and/or the internet when the user uses the work identifier (e.g., 'sam-work'), while the user may be restricted to web browsing, when using the private identifier (e.g., 'sam-private'). The use of the work identifier may be bound to a stronger local authentication (e.g., use of an additional key-fob, face/fingerprint-recognition using the camera, etc.). Different profiles may be generated (and/or managed) at the OPSF (e.g., by providing a web-interface where users may manage their profiles with additional information). The OPSF may synchronize the list of available profile identifiers with the local OP of this subscriber (e.g., using smartcard OTA management methods).

The use of the identifier select method may allow the creation of random identifiers at the local OP. From an MNO perspective, this may be a special option that the subscriber may purchase (e.g., on a monthly basis), which may enable the local OP to create unique, per-login random identifiers (e.g., openid.novalyst.de/id/12zjoxnf84). As no feedback may be given to the network and/or OPSF, users may achieve a high level of privacy towards services, as another identifier may be generated each time the user logs in to this service. In the case that services may want identifier persistence, the local OP may also generate another random identifier per service and/or use the same random identifier when going to the same service again (this may be referred to as directed identifier). Other implementations, such as timeouts for identifiers, may be used, such that the local OP refreshes or generates another random identifier after a certain period of time.

The embodiments described herein allow for the implementation of claims. Claims may be in a key-value format, where the key represents a certain property and the value represents the actual characteristics of that property. Claims may not be restricted, but there may be a common understanding between the claims issuer (e.g., OPSF and/or local OP) and the consumer site. Some examples of possible claims are given below:

TABLE 1

Claim Keys and Values

| Claim key | Claim value |
|---|---|
| Over 18? | Yes/No |
| Gender | Male/Female |
| Member of service group | Yes/No |
| Allowed to vote? | Yes/No |
| ... | ... |

When using the identifier select option of OpenID with a local OP entity, one model may be to represent a claim by an identifier (e.g., if a user can use the identifier openid.novalyst.de/id/over18, he conveys the information on this claim to the Service). Users who are under 18 may not be able to assert this identifier since it is not enabled in their local OP. Such a simple model may cause the user to perform an OpenID run for each claim the user wants to convey to the Service. The assurance that this claim is true may be derived from the trust that the Service has in the assertions being made from this OpenID provider (e.g., the Service trust that OpenID provider openid.novalyst.de truthfully checks claims before enrolling them into the local OPs).

The use of claim groups, or claim profiles may allow transmission of multiple claims in a single identifier, but may cause the Services and/or network OpenID provider to agree on a common scheme and semantics or a means of negotiating the information. For example, one option may be to define the set of possible claims which may be served with this OPSF/local OP, and create the identifier locally by concatenating the claims to attest to a single identifier.

For example, assume that Services and OpenID provider have agreed on the claims referenced in the table above, by referring to them using the following keywords:

TABLE 2

Claim keys, Values, and Keywords

| Claim key | Claim value | Keyword |
|---|---|---|
| Over 18? | Yes/No | over18/under18 |
| Gender | Male/Female | male/female |
| Member of service group | Yes/No | ismember/isnomember |
| Allowed to vote? | Yes/No | canvote/cannotvote |
| ... | ... | ... |

The local OP may provide the user with an interface to construct the identifier based on the claims that the user selects. For example, the user may want to select his gender and age proof from a drop down list, so that the local OP may proceed and/or create an identifier (e.g., openid.novalyst.de/id/over18_male) and/or sign it. The Service may verify the signature and/or the desired information to provide appropriate services. The user may not have to disclose his identity (e.g. 'sam-private') or the attributes to the service. Services and OPSF/local OP may agree on a common dictionary or language to build a claim set using the same, or similar, set of keywords and, optionally, order of concatenation, or the like. These may be configured (e.g., developed and/or updated) in a variety of ways. This approach may be more sophisticated and may not be limited to the keywords approach described in the table.

In an alternative embodiment, the claims may be assembled by the OPSF, and/or relayed to the Service, under guidance from the user or through negotiation of the required attributes by the Service and through gaining approval from the user. In this embodiment, the OPSF may act on behalf of the user in releasing information to the Service.

Figure 14:
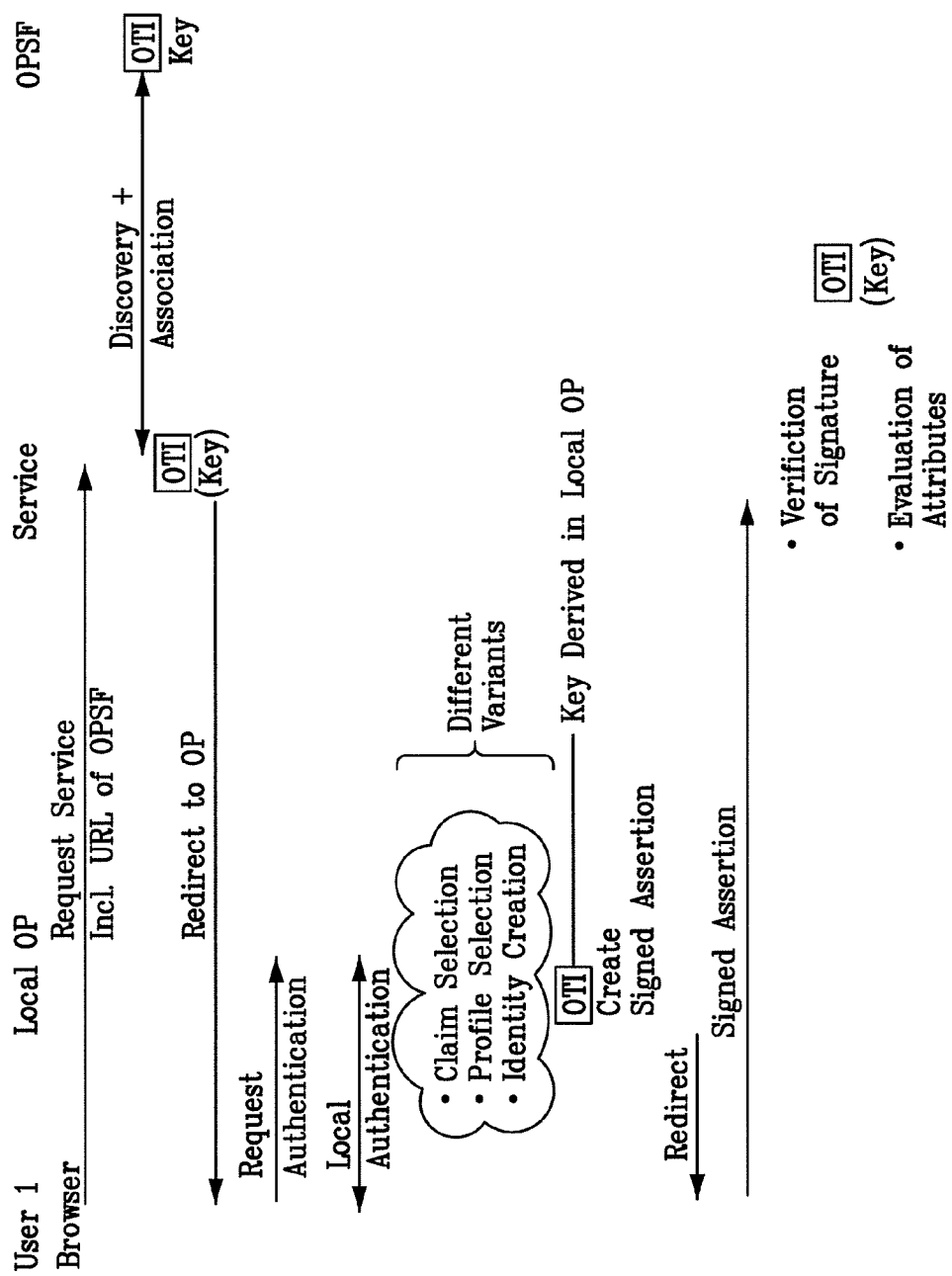
FIG. 14 is a flow diagram illustrating an example embodiment for using key signatures and local OP.

FIG. 14 is a flow diagram illustrating the use of key signatures and local OP, as is further described herein.

Figure 15:
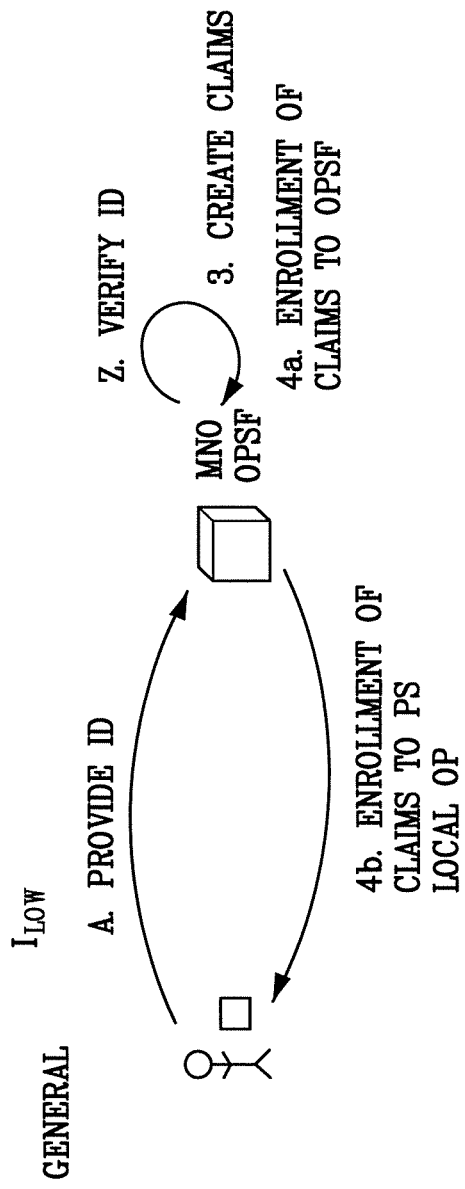
FIG. 15 is a diagram illustrating an example embodiment for creating claims.

In addition to the use of multiple identifiers, which may be used in different contexts (e.g. work and private identities), partial identities or identity profiles may also be created and may be built from a set of claims. FIG. 15 is a diagram illustrating one example process for creating claims which may be used by a local OP. Claims may represent a verifiable attribute of an identity, which may be relayed to services to convey partial identity information. The information may initially be verified by the operator of the OPSF (e.g., using out of band processes like passport/ID verification). Claims may refer to exact data, or to an abstraction of it. For example, an identity attribute (e.g., date of birth) may be used to create a set of claims (e.g., full date of birth, month of birth, year of birth, over18, over21, etc.). Claims may be classified into at least four different types: actual data (e.g., exact date of birth), proof of range (e.g., age>18 or age>25), membership (e.g., subscriber vs. non-subscriber or platinum member vs. normal member), and logical combinations (e.g., platinum member and account balance>100000).

Figure 16:
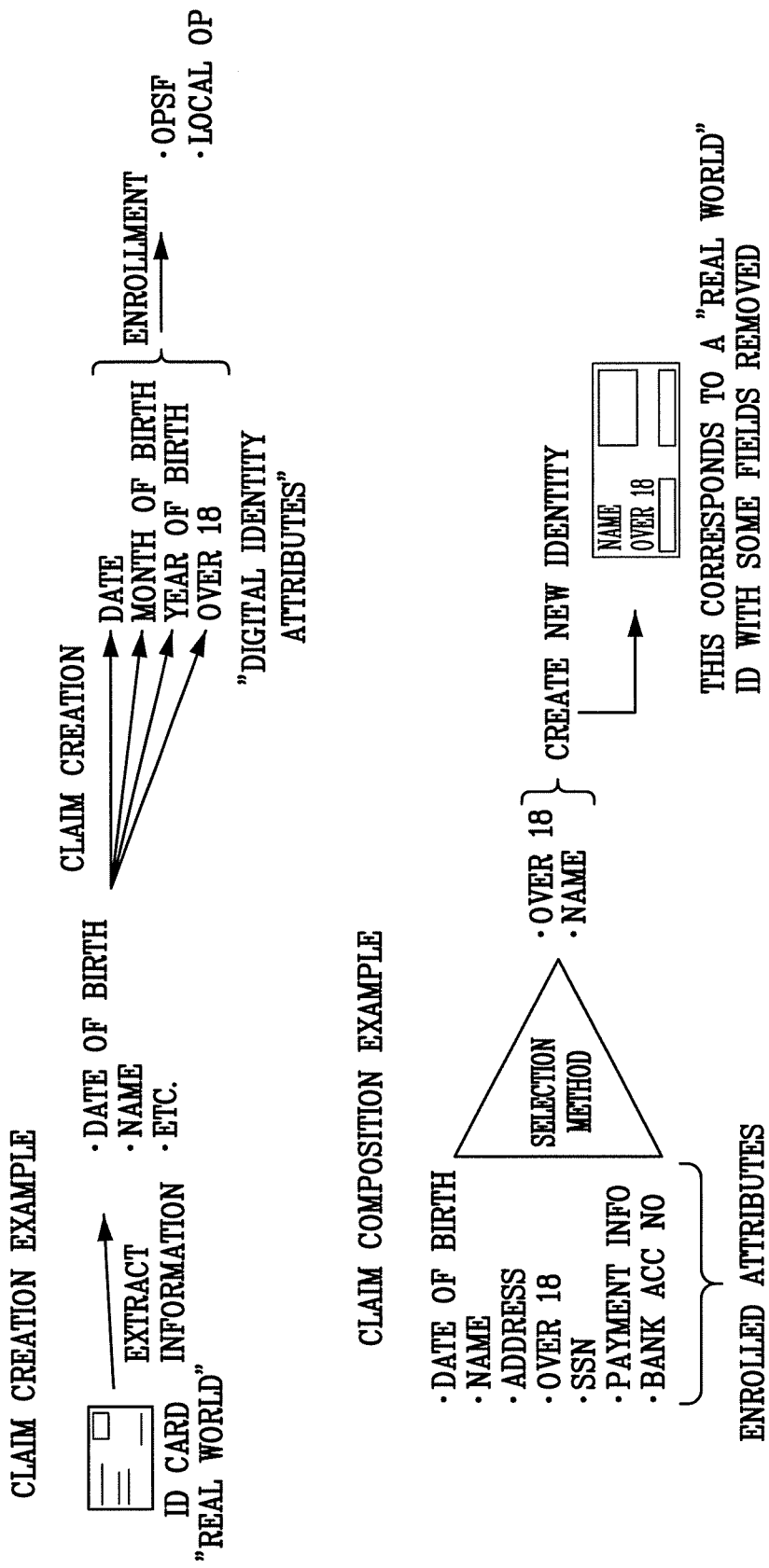
FIG. 16 is another diagram illustrating an example embodiment for creating claims.

After verification of the identity, the OPSF may create the claims and store them at the OPSF or make them available in the local OP. A single information may be used to create a whole set of claims, as illustrated in FIG. 16 for example. The claims may be used to create other identities, which consist of an arbitrary combination of claims. The creation of these other identities may be done by the OPSF or the local OP. If the composition of the identities is performed by the local OP, a higher level of privacy may be achieved, since the OPSF may not get an indication of what attributes/claims have been used for the creation of this identity.

Embodiments are described herein for the creation of claim based identities. For example, an identifier may be used to represent an attribute. According to this embodiment, the identifier may carry information on the attribute. Each claim/attribute may have its own identifier (e.g., openid.mno.com/id/over18 may be enrolled to local OP instances which belong to subscribers with an age of 18 or older). When a user authenticates toward a service using this identity, the service may immediately get information from the identity. For example, the service may get the information that: 1) the MNO verified the age and/or is responsible for the veracity of this data, and 2) the user is over 18. According to this embodiment, an identifier may be created for each attribute. One attribute may be conveyed per authentication flow. Identifiers may be combined, to convey more than one attribute for example.

According to another embodiment, OpenID protocol extensions may be used. For example, simple registration extension (SREG) and Attribute Exchange (AX) may be used. The protocol extensions may allow the exchange of additional identity information. The local OP may have a set of verified claims enrolled. The set of claims may be stored protected in a secure element, such that the claims may not be changed by the user. When the user authenticates towards the local OP, the local OP may allow the user to select the claims/attributes that may be included in the signed assertion message. The identifier which is sent to the service may be the regular OpenID identifier of the user (i.e., the username) or a random identifier, which may be created by the local OP. In both cases, the attribute/claim information may be sent as additional parameters of the message to the service, signed with the OpenID key for example, so that the service may verify the claims autonomously. This embodiment may use the specified SREG/AX extensions to the OpenID protocol for example.

If claims are stored with the local OP, the creation of these identifiers may happen locally, without further involvement of the network. This may allow for privacy enhanced exchange of attributes.

Figure 17:
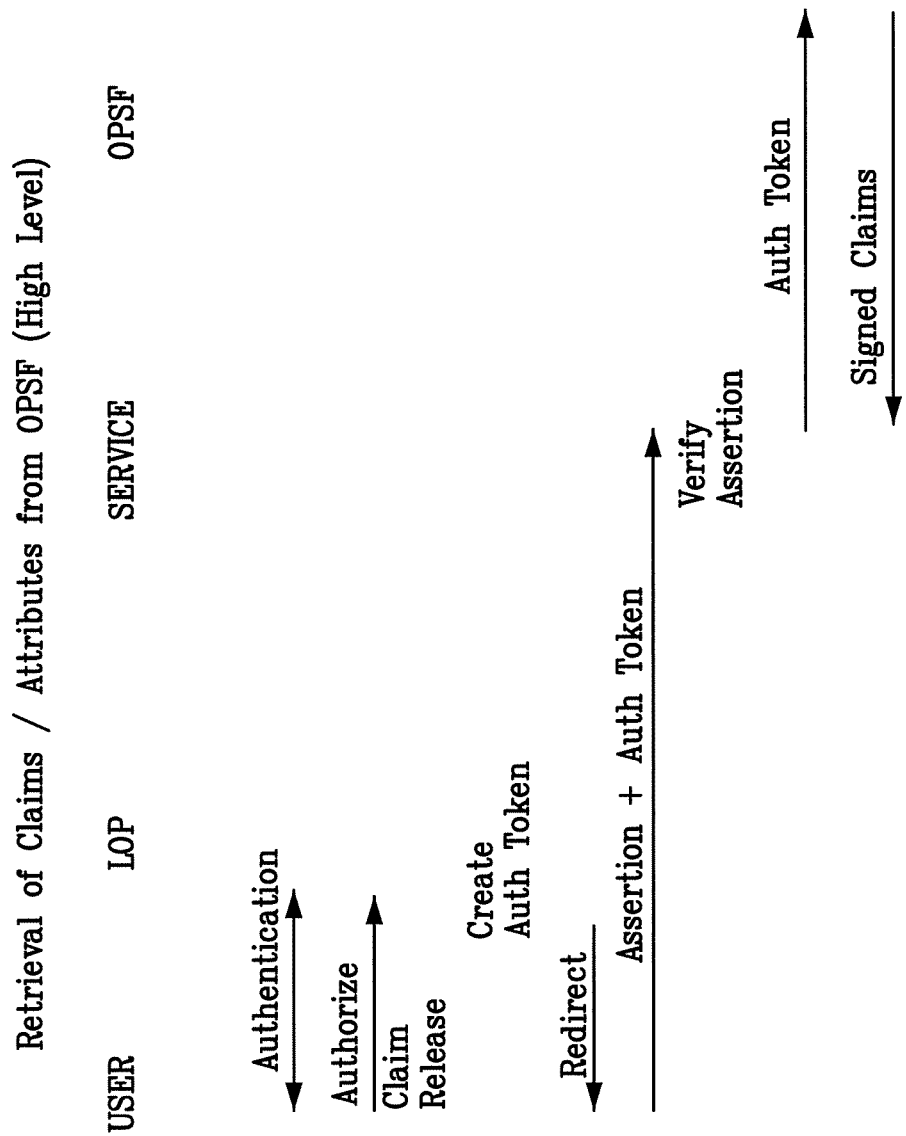
FIG. 17 is a diagram illustrating an example embodiment for retrieving claims/attributes using local OP.

In another implementation, claims may be stored in the network. Then at least two variants may apply: 1) the network entity may create the identities (e.g., based on policies or user input) or 2) the local OP may create a token which may be sent to the service in the authentication flow, which may allow the service to retrieve the claim attribute data from the network entity in a follow-up protocol flow. FIG. 17 is a diagram illustrating an example embodiment for retrieving claims/attributes using local OP.

A user may not have to go through the process of creating identifiers out of the claims every time the user wants to access a service. The local OP may provide mechanisms to store previously created identities/claim sets, which may be re-used by the user with different service providers.

As claims may become invalid over time, revocation of claims may be enabled. According to an embodiment, the network may remove the claim from the local OP (e.g., using OTA mechanisms), so that the claim may no longer be used to create identifiers with the local OP. According to an embodiment, the network may remove the claim from its own database, or may flag it as expired for example, so that the claim may no longer be used. According to another embodiment, expiration information may be included in the claim itself, such as when expiry is known from the beginning for example.

FIGS. 18-32 are screenshots illustrating example embodiments incorporating the use of identifiers (and/or claims) and local OP. While these figures illustrate identifiers that may be provided to and/or selected by a user, claims may also be provided to and/or selected by a user to determine a secure and/or trustworthy identity as described herein.

Figure 18:
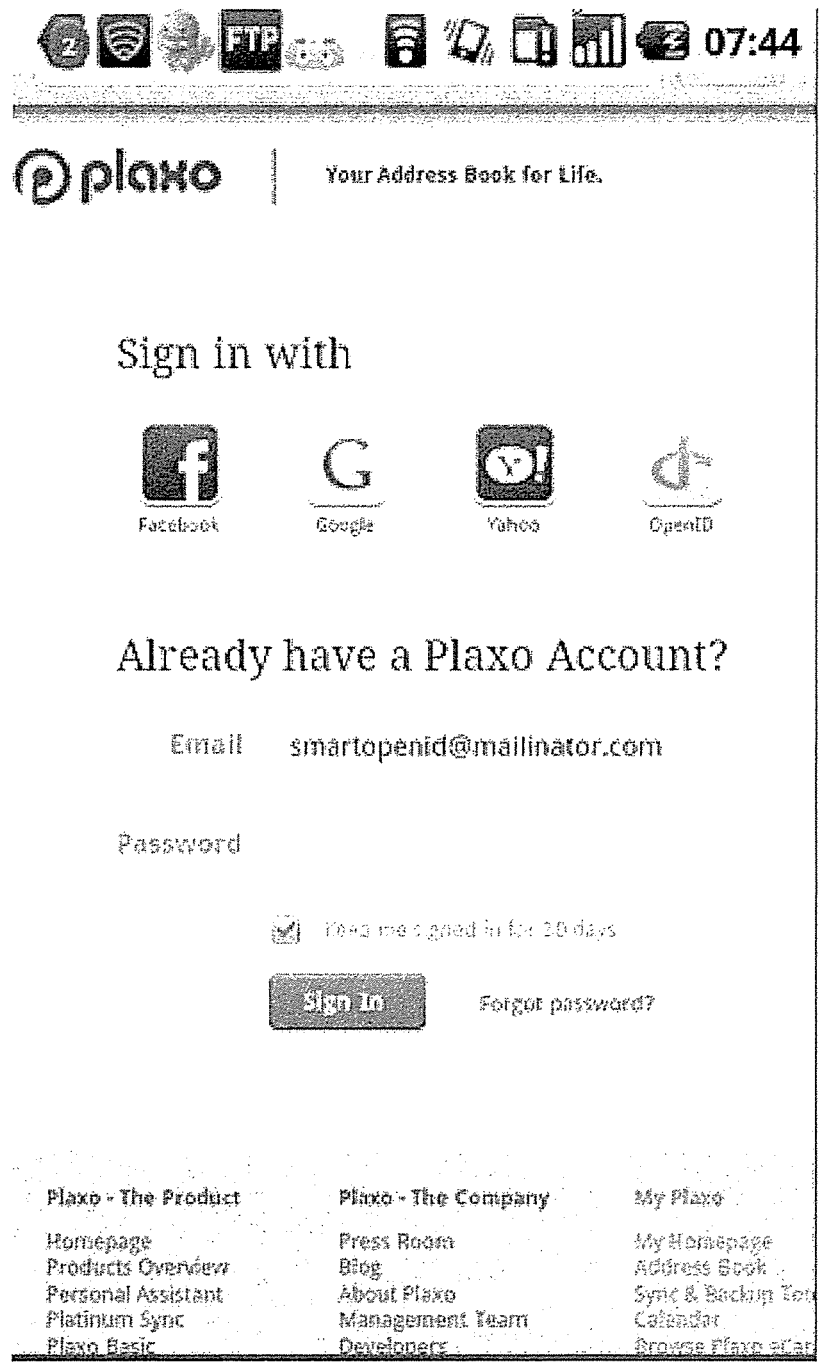
FIGS. 18-32 are screenshots illustrating example embodiments for using identifiers and local OP.
Figure 19:
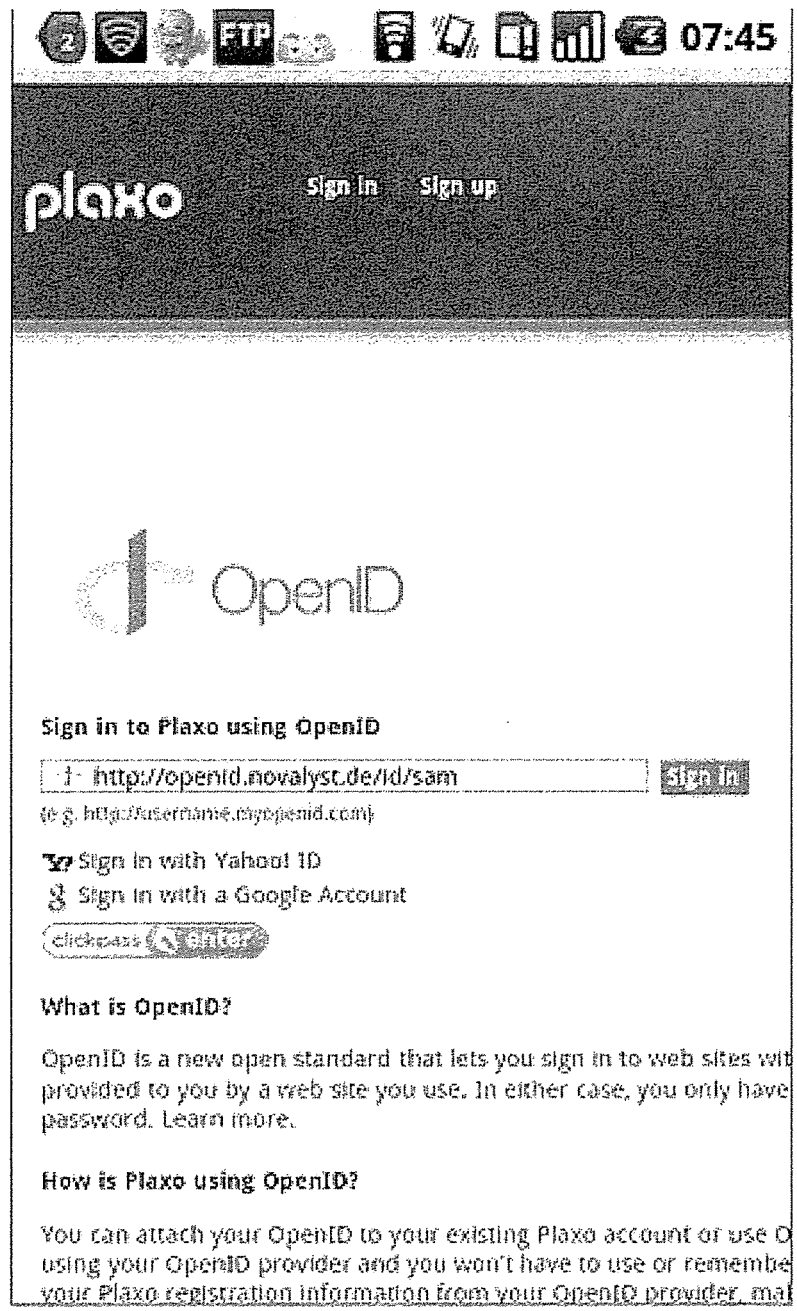
Figure 20:
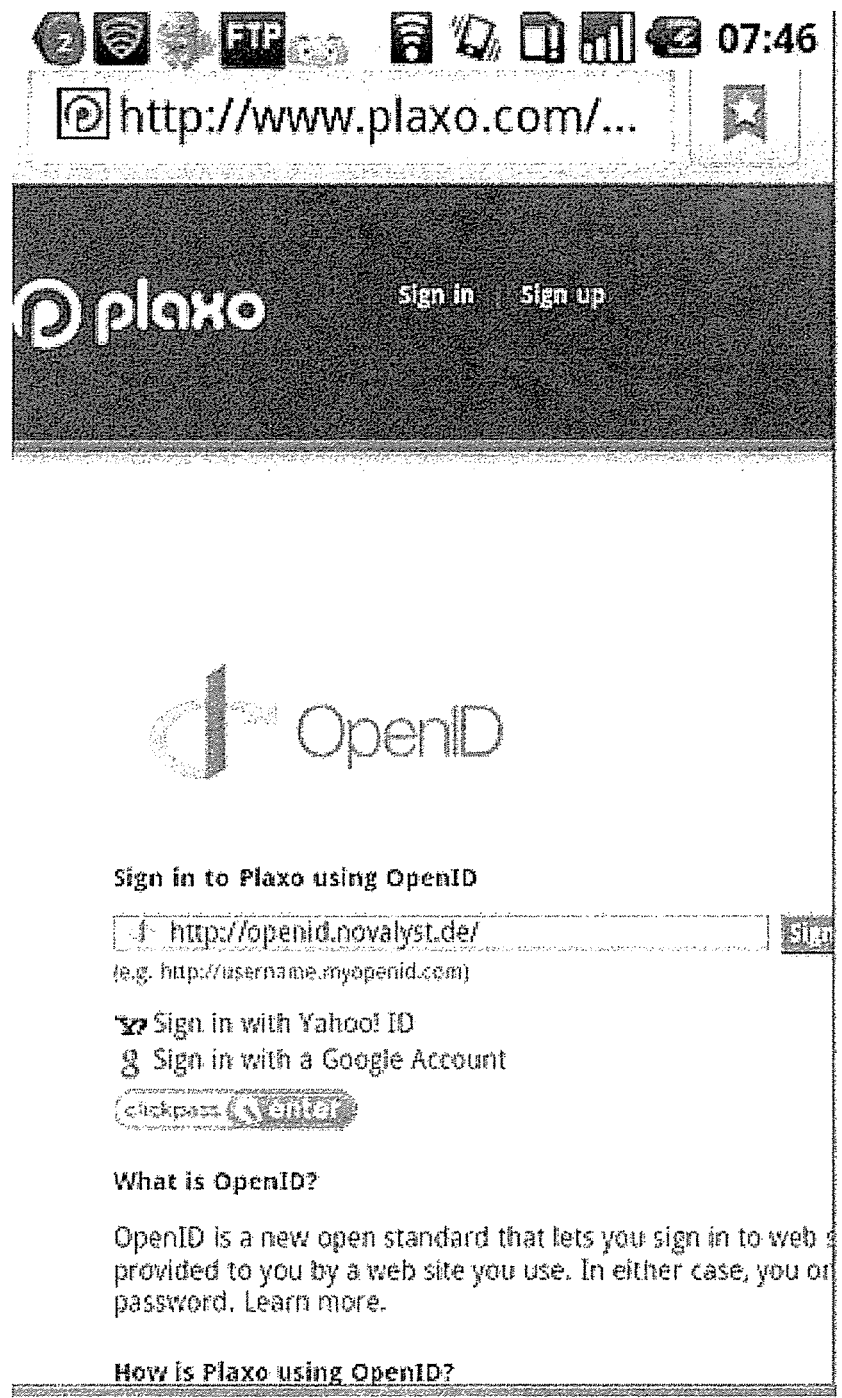

FIGS. 18-25 illustrate an example implementation of a login using identifier select. As illustrated in FIGS. 18-25, identifier select may be used with local OP, such as on a web service for example. As illustrated in FIG. 18, a user may log in to a web service (e.g., plaxo.com) using the user's OpenID identifier. According to one example, the user may click on the Open ID logo corresponding to the OpenID identifier to which the user wishes to use. As illustrated in FIGS. 19 and 20, the user may be asked to enter his or her OpenID identifier in the login form provided by a service (e.g., plaxo.com). Instead of using the full identifier, as shown in FIG. 19, the user may enter the base URL of his or her Open ID provider, as shown in FIG. 20. By entering the URL of the OpenID provider instead of the full OpenID identifier, the service (e.g., plaxo.com) may use the identifier select method of OpenID and/or build an association with the OPSF (e.g., at openid.novalyst.de, which is not shown).

Figure 21:

FIG. 21 is a screenshot illustrating options for selecting an identifier, such as when using a local OP for example. According to another embodiment, the options may comprise claims that may be provided to the service provider to indicate an identity, as described herein. A user may be redirected to the user's local OP to select an identifier, such as from a pre-installed list of identifiers for example. The list may be stored in the local OP application. No pre-selection or policies may be applied by the local OP to restrict the use of the installed identifiers. According to one embodiment, the user may not change the list and/or may not select an identifier other than resented by the local OP. The user may select one of the displayed identifiers, such as the 'sam' identifier illustrated in FIG. 21 for example.

Figure 22:
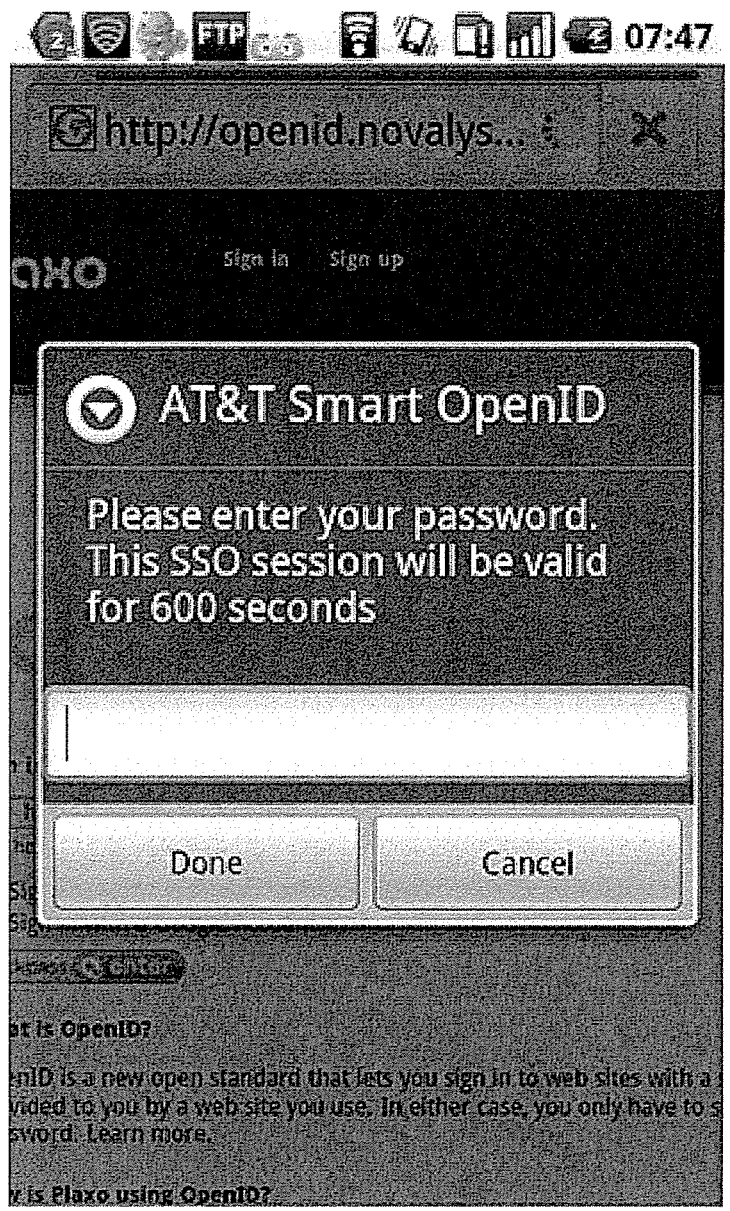

Once the user selects an identifier, the user may be asked to enter his or her SSO password for the local OP. FIG. 22 is a screenshot illustrating a user prompt for entering an SSO password locally. This can be seen similar to a credential vault storage. Once the user supplies the password, which may not be sent over the network (e.g., since it may be communicated locally to the local OP), the local OP may remember this SSO session. For example, the SSO session may be remembered for a predefined period of time (e.g., 600 seconds).

Figure 23:
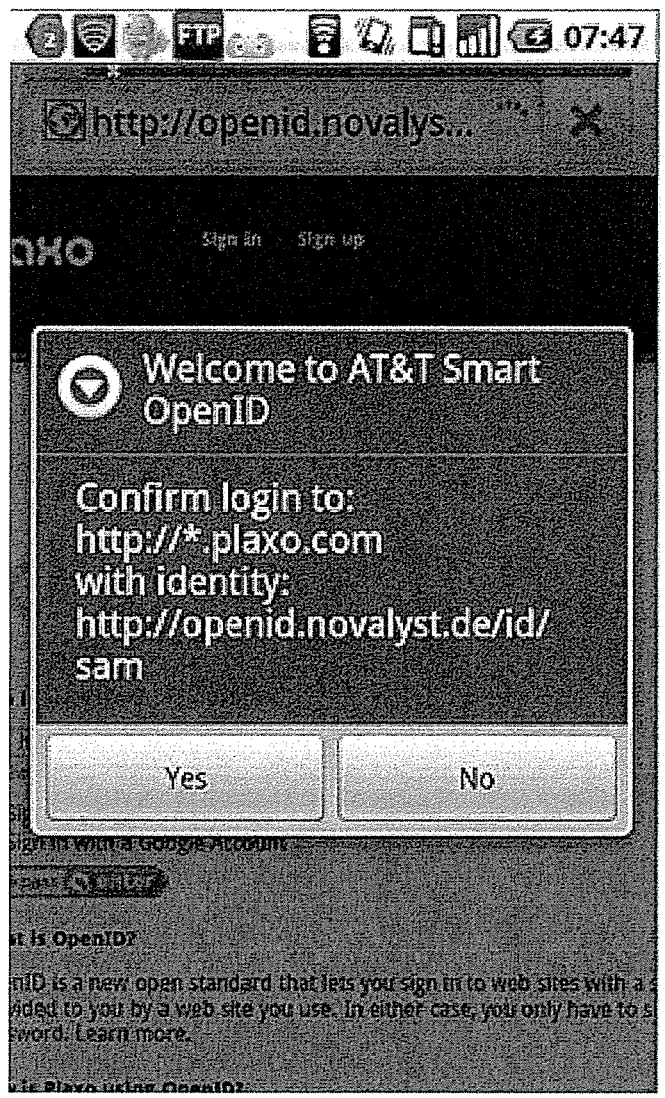
Figure 24:
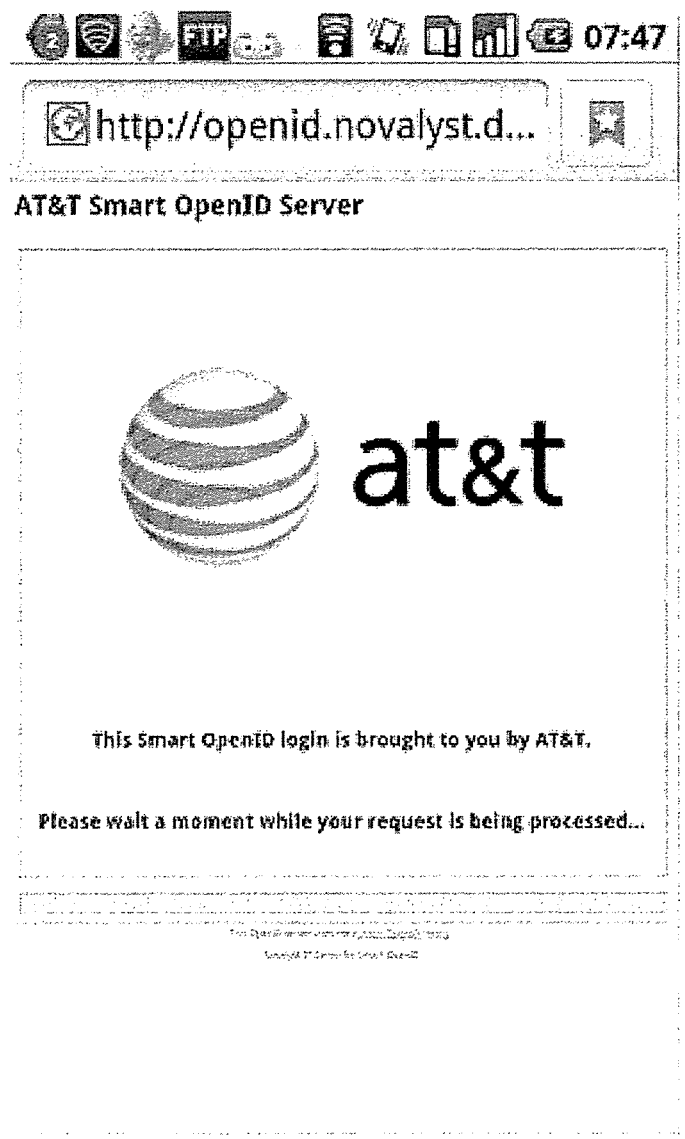
Figure 25:
Figure 25:

The user may be asked to confirm the login. FIG. 23 is a screenshot illustrating a user prompt for confirming login using the local OP. As illustrated in FIG. 23, the local OP may present the identifier that the user may use and/or the service that the user may be logged in to. As illustrated in FIG. 24, the local OP may, optionally, display an advertisement screen. The advertisement may correspond to the operator enabling the OpenID login for example. Once the user is successfully logged in, the user may receive notification that the login was successful, such as the notification of successful login illustrated in FIG. 25 for example. According to one example, the notification may include contact information associated with the OpenID identifier selected by the user.

FIGS. 21, 24, and 26-28 illustrate an example implementation of the use of the Smart OpenID login button, such as on a web service site for example. A service may be equipped with a Smart OpenID button. The Smart OpenID button may work with the OPSF.

Figure 26:
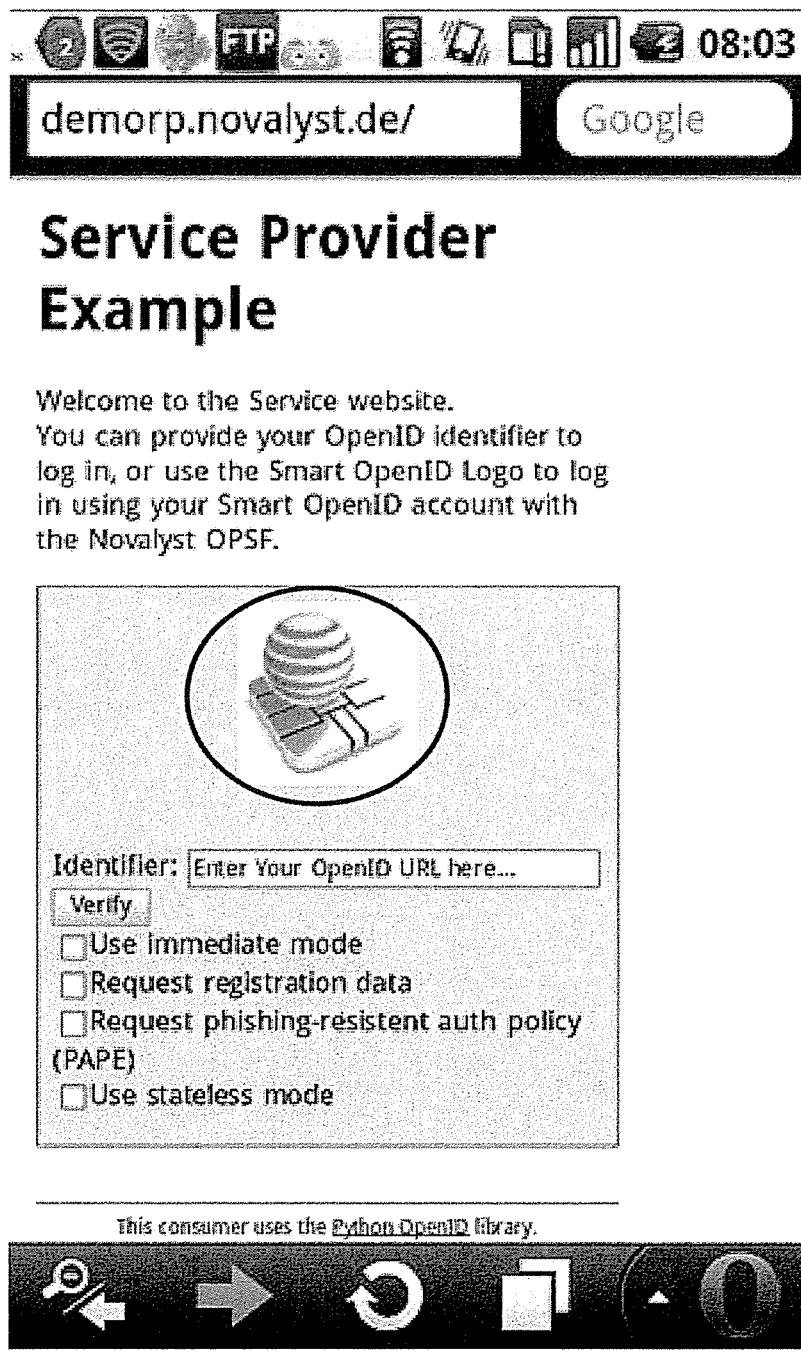
Figure 27:
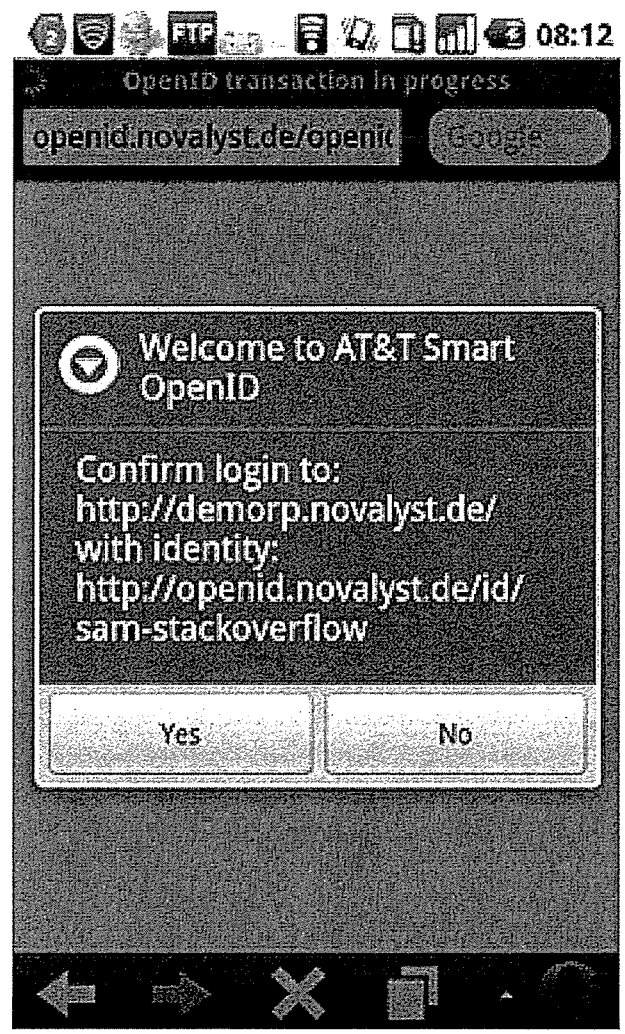
Figure 28:
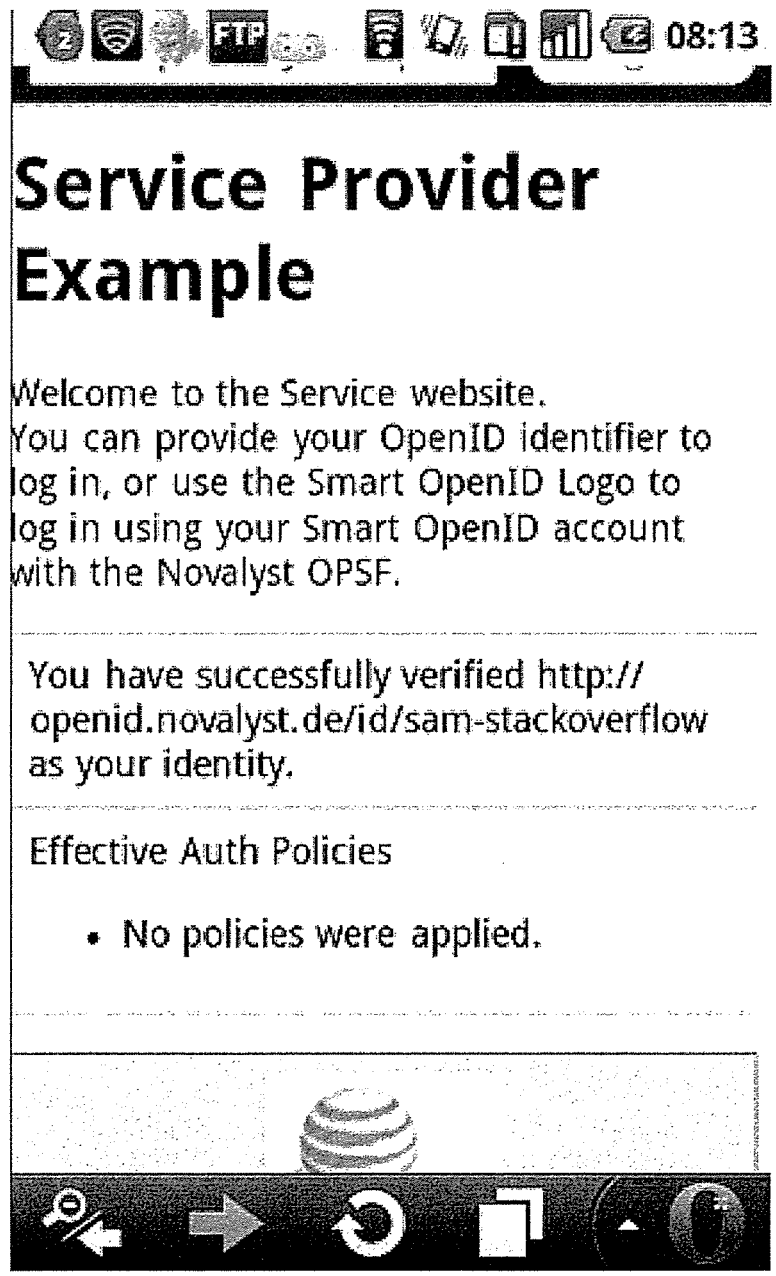

As illustrated in FIG. 26, a user may access a service provider login screen. The service provider login screen may be a service web page that may be used to access the Smart OpenID button. The Smart OpenID button may indicate that the user is able to login using the user's Smart OpenID provided by the user's provider. The user may use Smart OpenID by clicking on the provided button. The user may select an identifier for Smart OpenID. For example, the local OP may present the user a list of available identifiers, as illustrated in FIG. 21. The user may select an identifier provided by the local OP, such as the 'sam-stackoverflow' identifier in FIG. 21 for example. The user may be asked to confirm the login with the chosen identifier (e.g., 'sam-stackoverflow'), as illustrated in FIG. 27. Again, as illustrated in FIG. 24, an advertisement may be placed in the OpenID login. For example, the MNO (or OpenID provider) may place ads or branding in the login process. Once the user is successfully logged in to the service, the user may receive notification that the login was successful, such as the notification of successful login illustrated in FIG. 28 for example.

Figure 29:
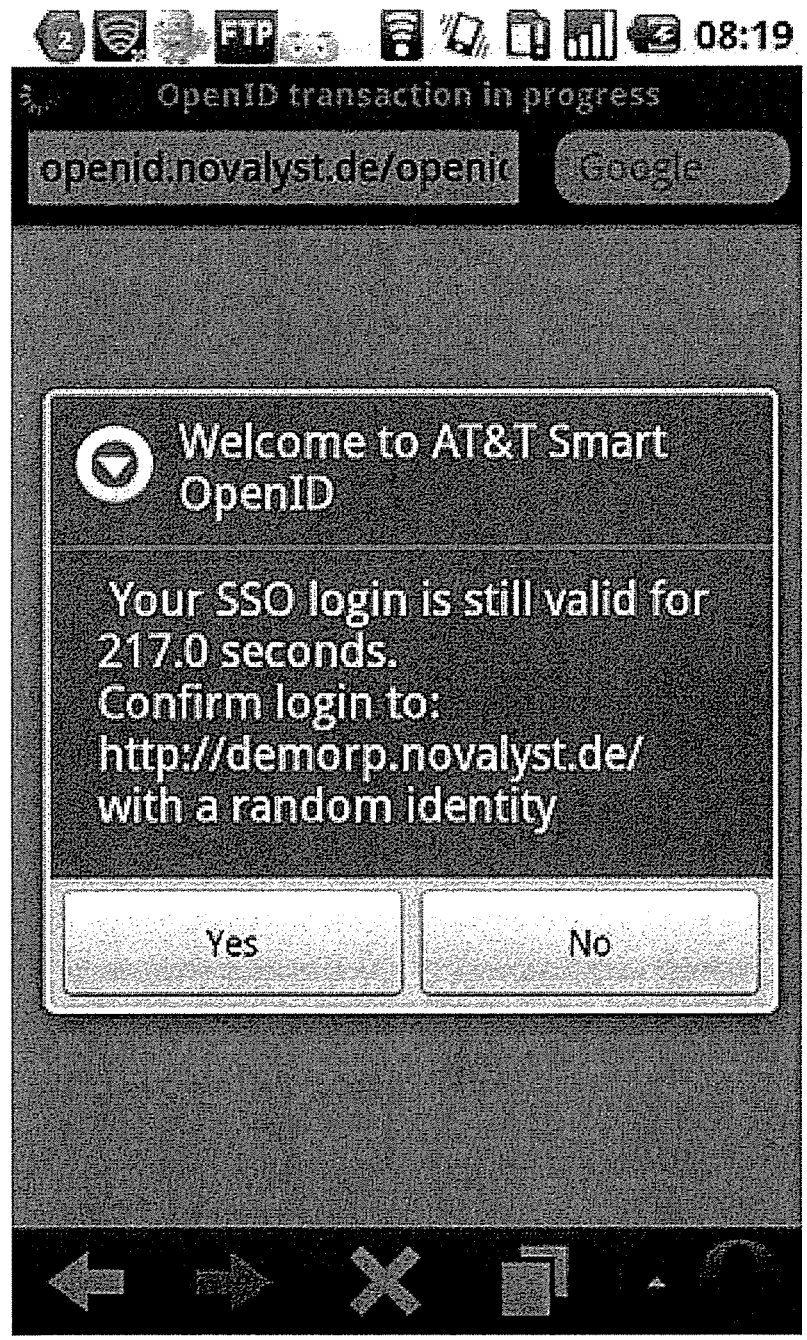
Figure 30:
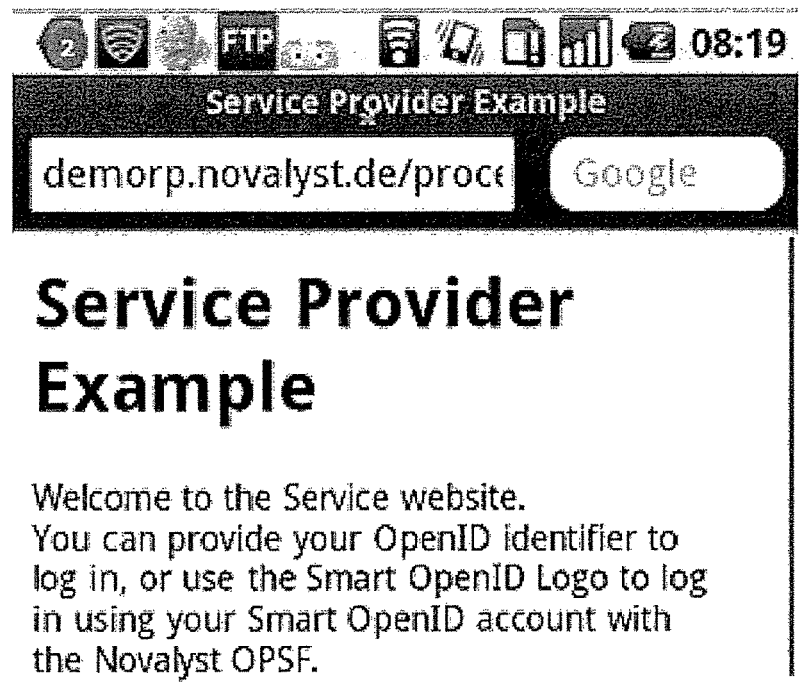

FIGS. 21, 26, and 29-32 illustrate an example implementation of the use of different, fresh identifiers for each login at a service (e.g., service provider web site). As illustrated at FIG. 26, a user may access a service provider login screen. The user may select the Smart OpenID button to log in to the service. The user may select an identifier to use to login. For example, the user may select a field in the selection screen which indicates that the local OP is to generate a random id for the user in this OpenID run to use with the service (e.g. the random_id field illustrated in FIG. 21). The availability of a random identifier may be controlled by an MNO/OpenID provider. For example, the MNO/OpenID provider may have direct control over the local OP application. According to one example embodiment, the availability of the random identifier may be based on an add-on subscription and/or be limited or unlimited in use. As illustrated in FIG. 29, a user may receive an indication that an SSO session is still active. The indication may include the amount of time for which the SSO session is active for example. While the SSO session is still active, the user may not have to re-enter the user's password (e.g., local password) to the local OP. The user may confirm that he or she would like to stay logged in to the service in which he or she is currently logged in. The local OP may generate a random identifier for the user and/or the user may be successfully signed in using the random identifier, such as the random identifier (e.g., http://openid.novalyst.de/id/olwa2whkiu) illustrated in FIG. 30 for example. The user may receive notification that the login was successful, such as the notification of successful login illustrated in FIG. 30 for example.

Figure 31:
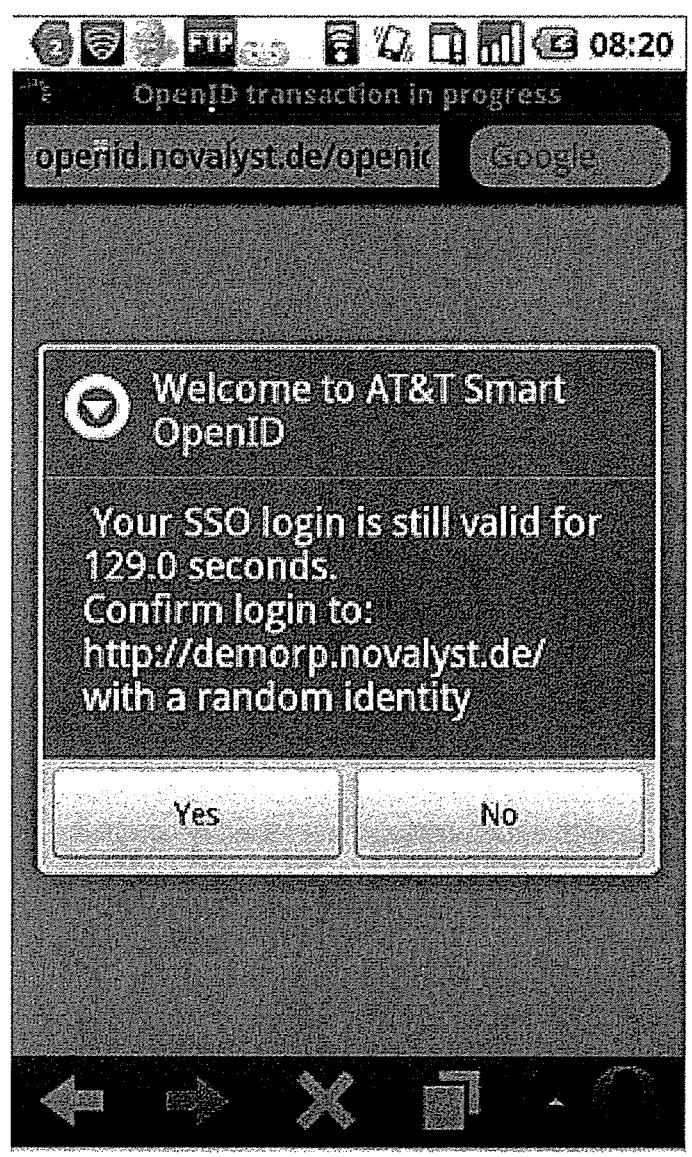
Figure 32:
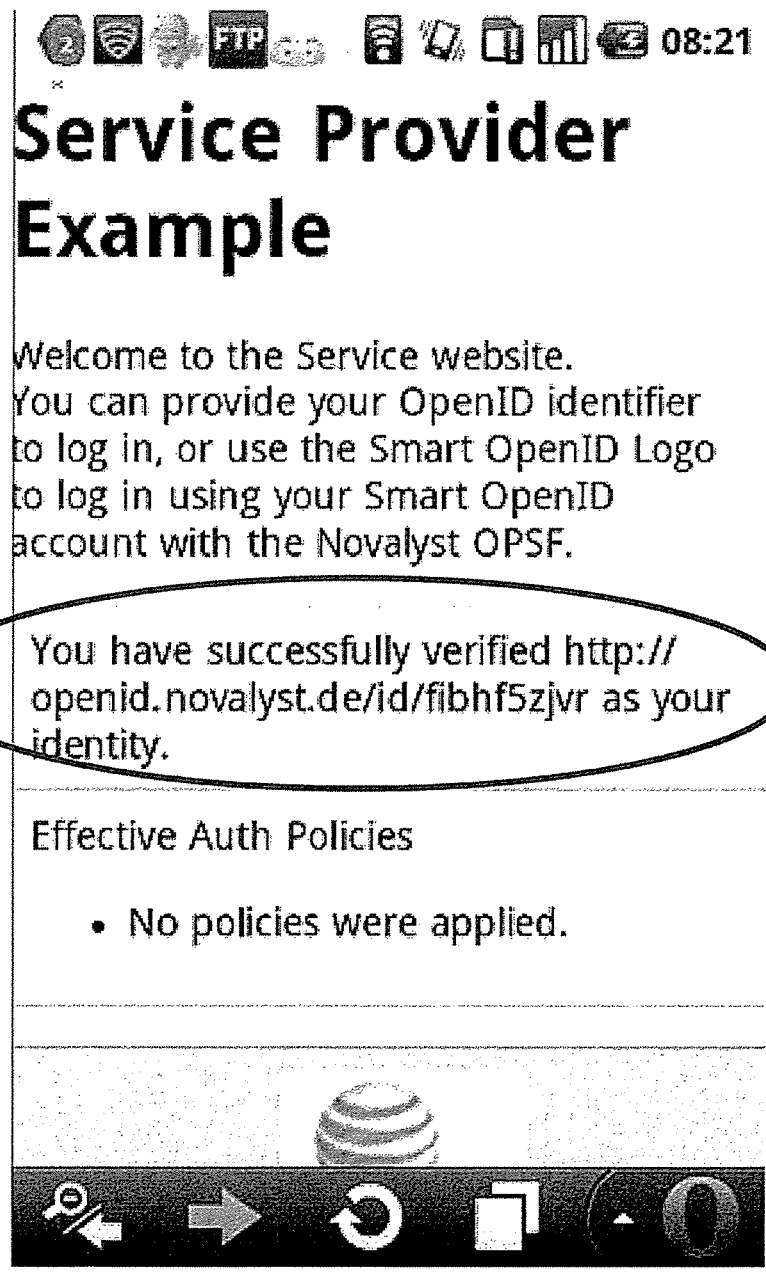

After the user has logged into the service, the user may want to log in again to the service. To log in again, the user may click the login button, illustrated at FIG. 26, again. The user may select the random_id field, illustrated in FIG. 21, again to log in. In this run, as illustrated in FIG. 31, the SSO session may still be active, so the user may not have to enter the password again. If the SSO session expired, the user may be asked to enter his password. Once the user is logged in again at the service, the user may have a fresh generated random identifier, such as identifier http://openid.novalyst.de/id/fibhf5zjvr illustrated in FIG. 32. Advertisements, such as the operator advertisements illustrated in FIG. 24 for example, may also be used as described herein.

Example Operating Environment

Figure 33A:
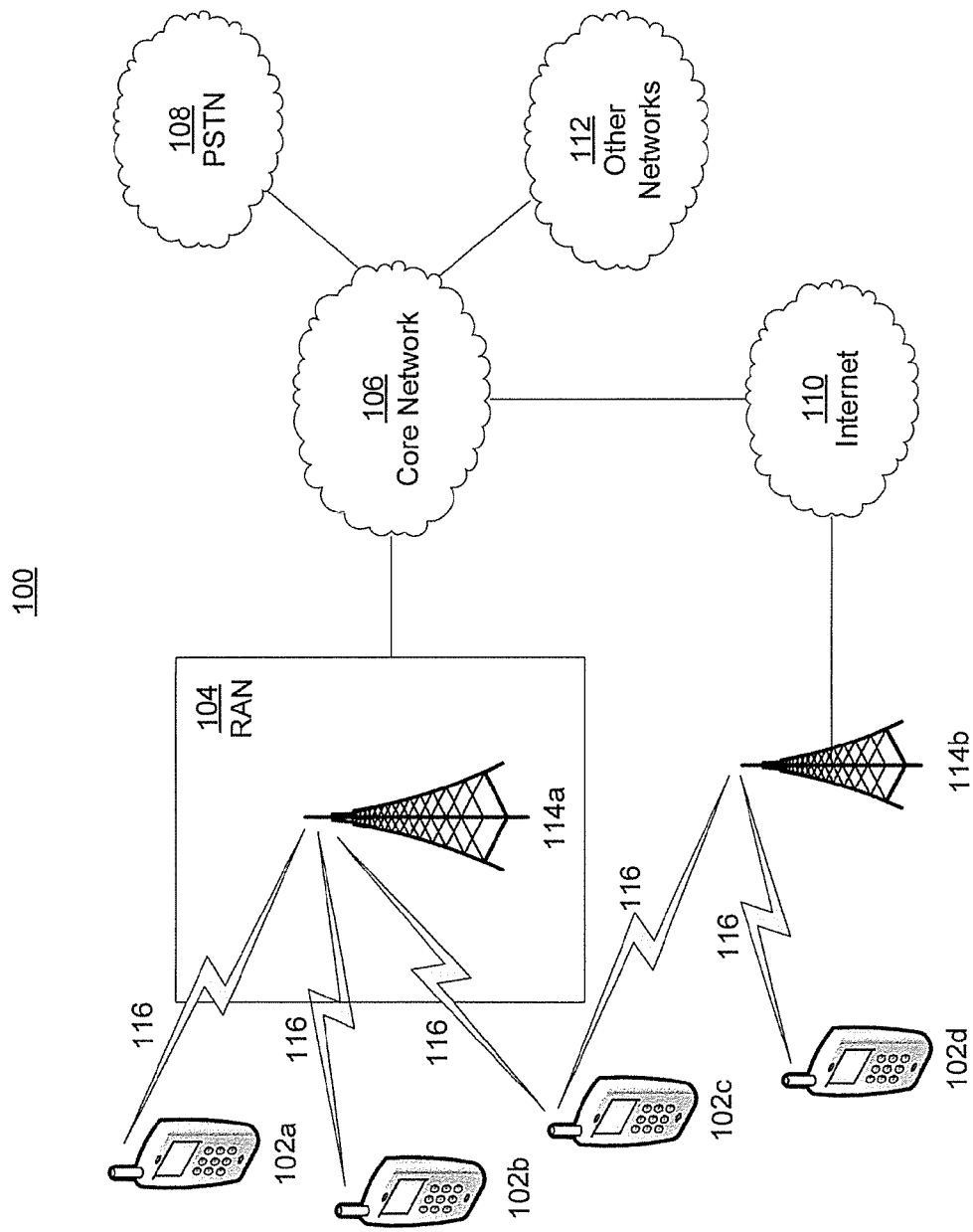
FIG. 33A is a system diagram of an example communications system in which one or more disclosed embodiments may be implemented.

FIG. 33A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 33A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 33A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 33A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 33A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 33A may be configured to communicate with the base station 114a, which may employ a cellular-based radio technology, and with the base station 114b, which may employ an IEEE 802 radio technology.

Figure 33B:
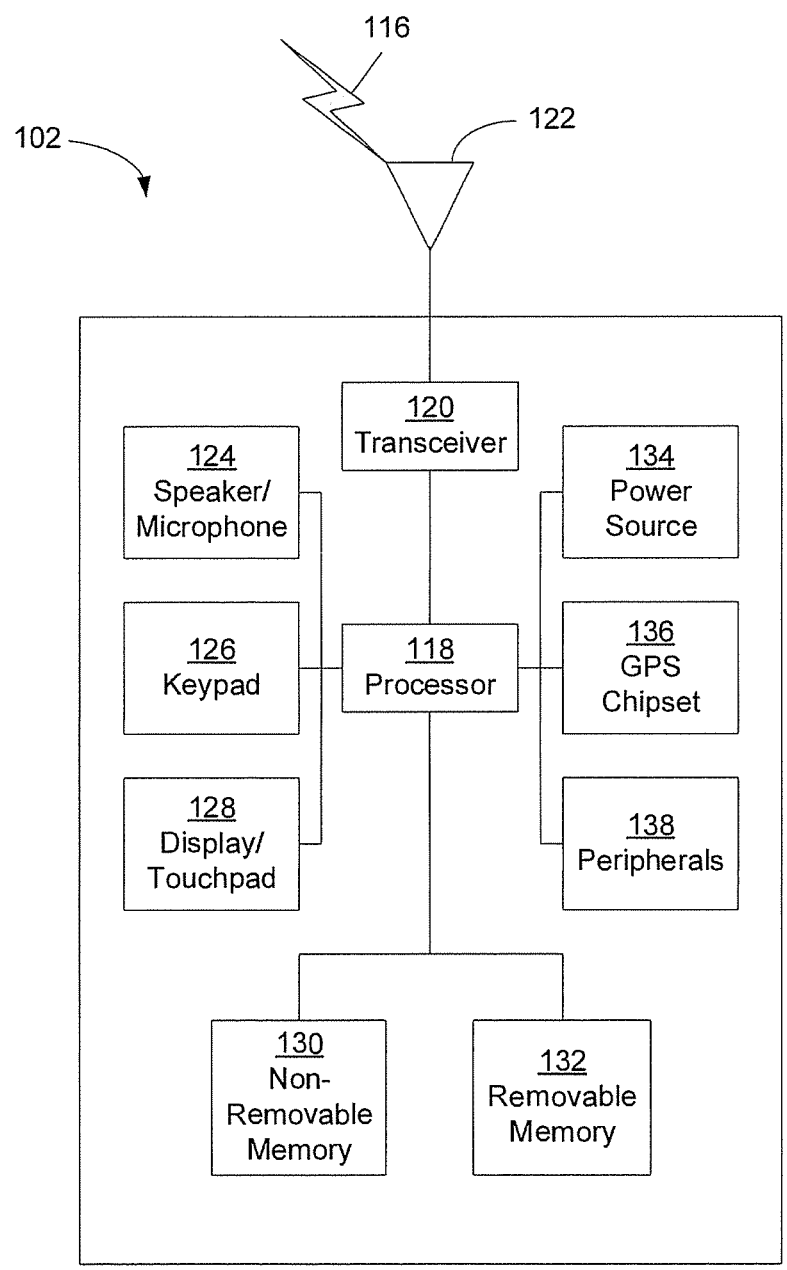
FIG. 33B is a system diagram of an example wireless transmit/receive unit (WTRU) that may be used within the communications system illustrated in FIG. 33A.

FIG. 33B is a system diagram of an example WTRU 102. As shown in FIG. 33B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 33B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 33B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 33C:
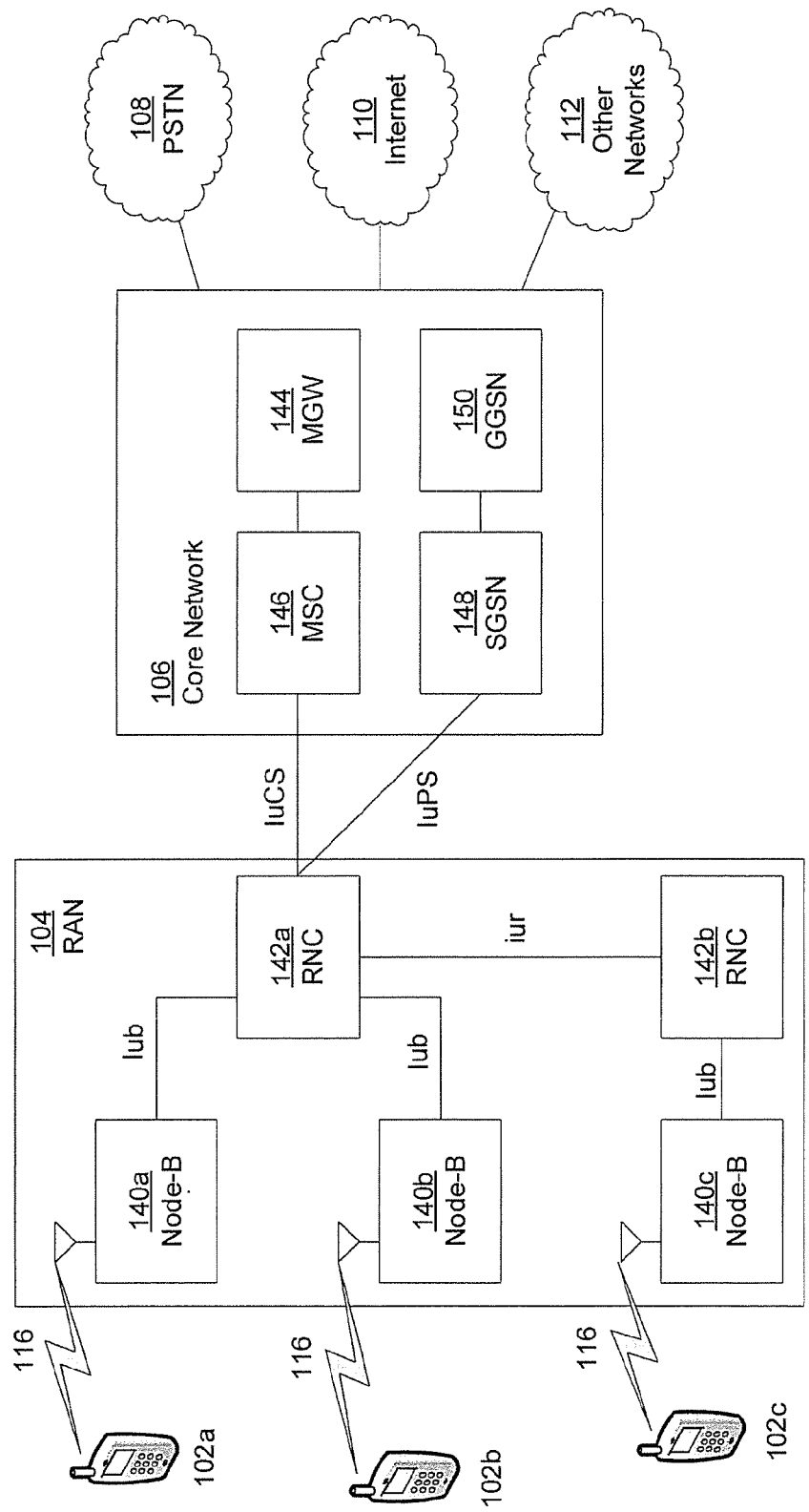
FIG. 33C is a system diagram of an example radio access network and an example core network that may be used within the communications system illustrated in FIG. 33A.

FIG. 33C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 33C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 33C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 33C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 33D:
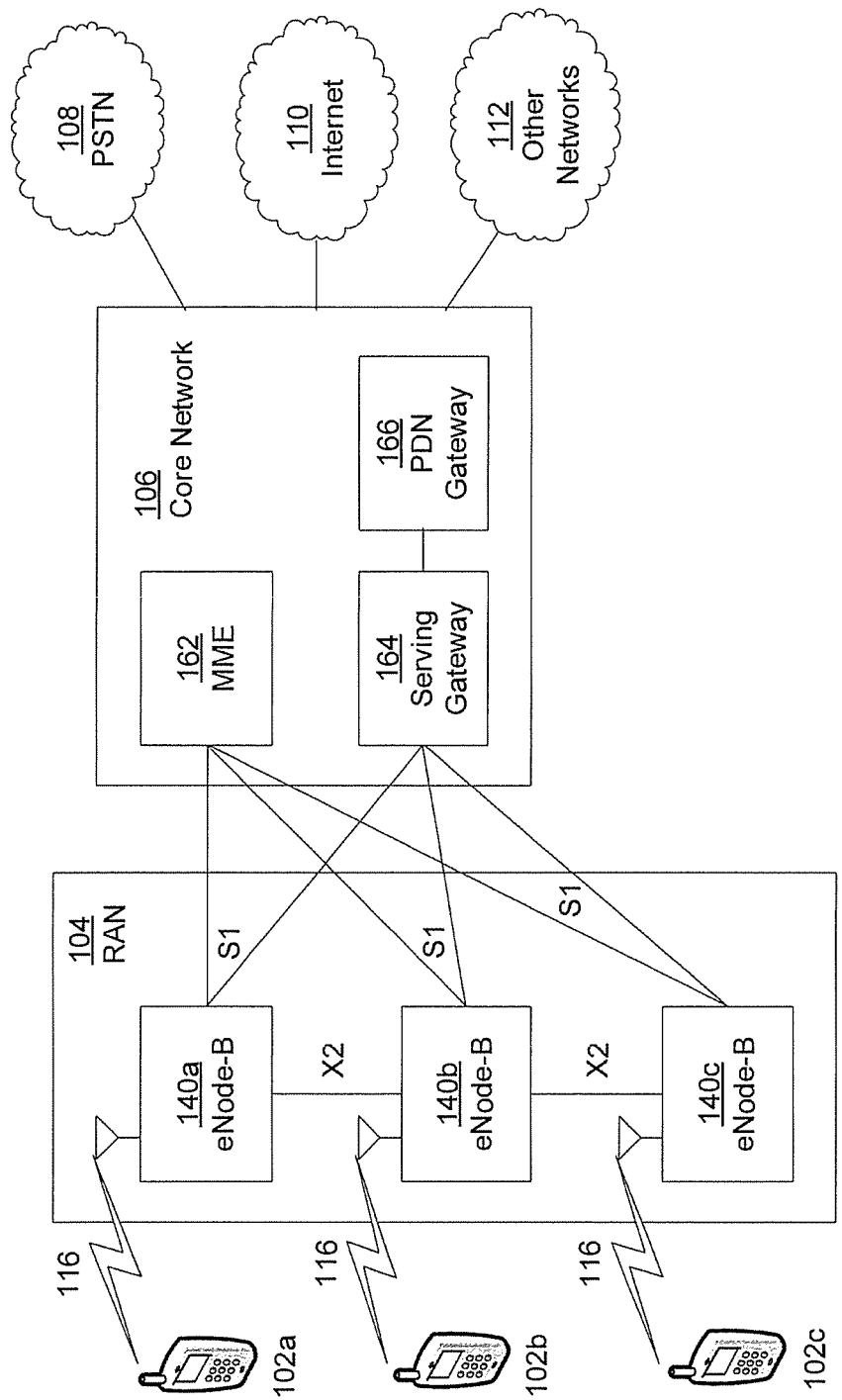
FIG. 33D is a system diagram of an example RAN and core network according to an embodiment.

FIG. 33D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 33D, the eNode-Bs 140a, 140b, 140c may communicate with one another over an X2 interface.

The core network 106 shown in FIG. 33D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 142a, 142b, 142c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 140a, 140b, 140c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 33E:
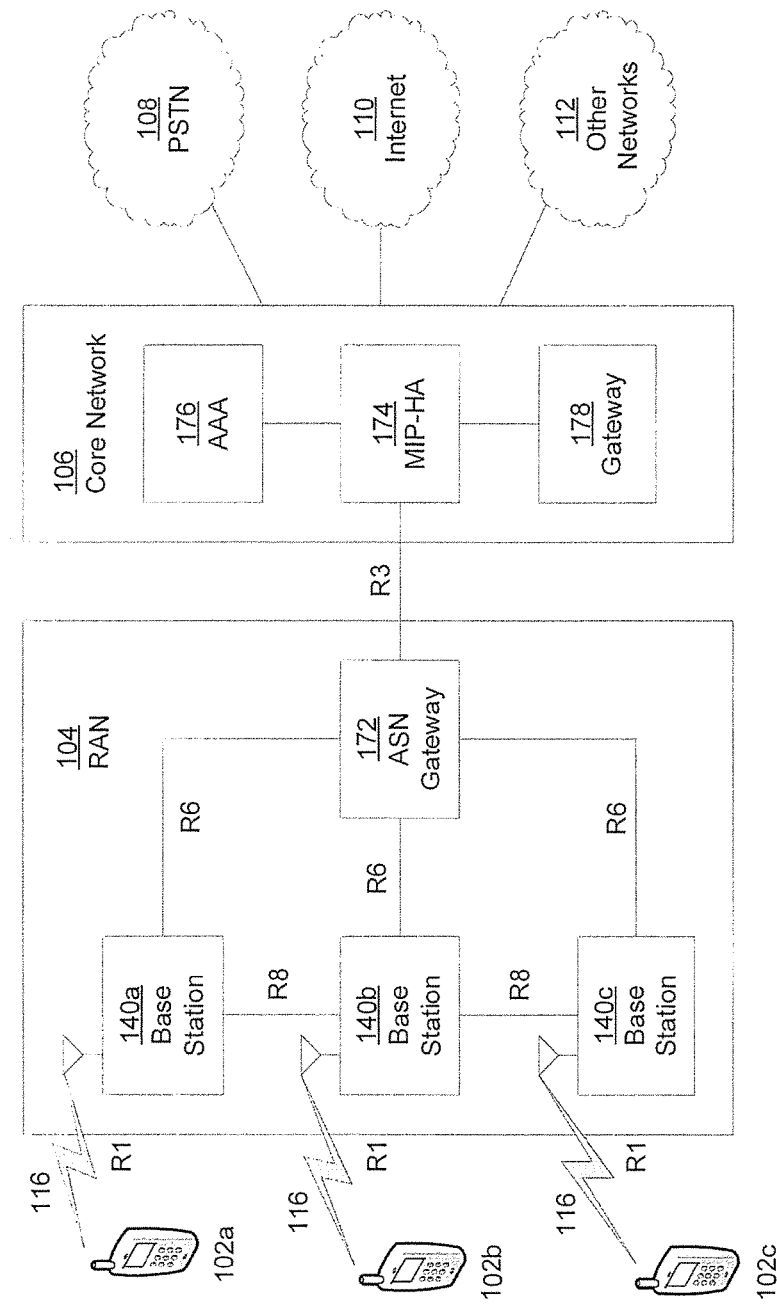
FIG. 33E is a system diagram of an example RAN and core network according to an embodiment.

FIG. 33E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 33E, the RAN 104 may include base stations 140a, 140b, 140c, and an ASN gateway 172, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 172 may be defined as an R6 reference point. The R6 reference point may include protocols for facilitating mobility management based on mobility events associated with each of the WTRUs 102a, 102b, 100c.

As shown in FIG. 33E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 33E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a user device comprising a processor and a memory, the method comprising:
   receiving a plurality of claims that each define a key and a value associated with the key, from a network identity provider, such that the plurality of claims is enrolled in the user device, wherein each claim is representative of a verifiable attribute associated with a user of the user device, and each claim is verified by the network identity provider before the claim is enrolled in the user device, such that each claim is associated with a trust that a service has in the network identity provider;
   after each claim is verified by the network identity provider, storing the plurality of claims on a secure local entity on the user device such that the plurality of claims cannot be changed by the user;
   creating a first digital identity associated with the user and corresponding to the service, wherein the first digital identity is based on a first portion of the plurality of claims;
   in response to a user selection of the first digital identity, authenticating with the service using the first digital identity such that the first digital identity conveys, to the service, respective verifiable attributes represented by the first portion of the claims, and the trust associated with the claims;
   removing the first portion of claims from the secure local entity on the user device when the first portion of claims expires, wherein each claim in the first portion of claims comprises expiration information corresponding to when the respective claim expires.

2. The method of claim 1, wherein the first digital identity is associated with the trust that the service has in the network identity provider.

3. The method of claim 1, the method further comprising:
   creating a second digital identity associated with the user and corresponding to the service, wherein the second digital identity is based on a second portion of the plurality of claims; and
   authenticating with the service using the second digital identity such that the second digital identity conveys, to the service, respective verifiable attributes represented by the second portion of the claims.

4. The method of claim 3, wherein at least one of the first and second digital identities is based on one claim.

5. The method of claim 3, wherein at least one of the first and second digital identities is based on more than one claim.

6. The method of claim 1, the method further comprising:
   sending the first digital identity to the service so that the service can authenticate the user and verify at least one required attribute of the user.

7. The method of claim 1, wherein the first portion of the plurality of claims represents an age of the user.

8. A user device comprising a processor and a memory, the memory comprising computer-executable instructions that when executed by the processor, cause the processor to perform operations comprising:
   receiving a plurality of claims that each define a key and a value associated with the key, from a network identity provider, such that the plurality of claims is enrolled in the user device, wherein each claim is representative of a verifiable attribute associated with a user of the user device, and each claim is verified by the network identity provider before the claim is enrolled in the user device, such that each claim is associated with a trust that a service has in the network identity provider;

after each claim is verified by the network identity provider, storing the plurality of claims on a secure local entity on the user device such that the plurality of claims cannot be changed by the user;

creating a first digital identity associated with the user and corresponding to the service, wherein the first digital identity is based on a first portion of the plurality of claims;

in response to a user selection of the first digital identity, authenticating with the service using the first digital identity such that the first digital identity conveys, to the service, respective verifiable attributes represented by the first portion of the claims, and the trust associated with the claims; and removing the first portion of claims from the secure local entity on the user device when the first portion of claims expires, wherein each claim in the first portion of claims comprises expiration information corresponding to when the respective claim expires.

9. The user device of claim 8, wherein the first digital identity is associated with the trust that the service has in the network identity provider.

10. The user device of claim 8, the memory further comprising computer-executable instructions that when executed by the processor, cause the processor to perform operations further comprising:

creating a second digital identity associated with the user and corresponding to the service, wherein the second digital identity is based on a second portion of the plurality of claims; and authenticating with the service using the second digital identity such that the second digital identity conveys, to the service, respective verifiable attributes represented by the second portion of the claims.

11. The user device of claim 10, wherein at least one of the first and second digital identities is based on one claim.

12. The user device of claim 10, wherein at least one of the first and second digital identities is based on more than one claim.

13. The user device of claim 8, the memory further comprising computer-executable instructions that when executed by the processor, cause the processor to perform operations further comprising:

sending the first digital identity to the service so that the service can authenticate the user and verify at least one required attribute of the user.

14. The user device of claim 8, wherein the first portion of the plurality of claims represents an age of the user.

* * * * *